US009354961B2

(12) United States Patent
Nagura et al.

(10) Patent No.: US 9,354,961 B2
(45) Date of Patent: May 31, 2016

(54) METHOD AND SYSTEM FOR SUPPORTING EVENT ROOT CAUSE ANALYSIS

(75) Inventors: Masataka Nagura, Yokohama (JP); Takayuki Nagai, Machida (JP); Kaori Murase, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 255 days.

(21) Appl. No.: 13/639,132

(22) PCT Filed: Mar. 23, 2012

(86) PCT No.: PCT/JP2012/057548

§ 371 (c)(1),
(2), (4) Date: Dec. 10, 2012

(87) PCT Pub. No.: WO2013/140608

PCT Pub. Date: Sep. 26, 2013

(65) Prior Publication Data

US 2014/0237297 A1 Aug. 21, 2014

(51) Int. Cl.
*G06F 11/00* (2006.01)
*G06F 11/07* (2006.01)

(52) U.S. Cl.
CPC .......... *G06F 11/079* (2013.01); *G06F 11/0727* (2013.01)

(58) Field of Classification Search
CPC .......... G06F 11/079
USPC .......... 714/26
See application file for complete search history.

(56) References Cited

U.S. PATENT DOCUMENTS 7,107,185 B1 9/2006 Yemini et al.
7,257,744 B2 * 8/2007 Sabet et al. .......... 714/56
7,349,826 B2 * 3/2008 Subramanian et al. .......... 702/185
7,877,636 B2 * 1/2011 Kim et al. .......... 714/26
8,411,577 B2 * 4/2013 Ge et al. .......... 370/242
8,429,453 B2 * 4/2013 Ito et al. .......... 714/25
2003/0074440 A1 * 4/2003 Grabarnik et al. .......... 709/224
2004/0230868 A1 * 11/2004 Sabet et al. .......... 714/25
2008/0114581 A1 * 5/2008 Meir et al. .......... 703/13

(Continued)

FOREIGN PATENT DOCUMENTS

JP 2010-191914 A 9/2010
JP 2011-209908 A 10/2011
WO 2010/016239 A1 2/2010

OTHER PUBLICATIONS

QuickSpecs, HP Network Node Manager i 9.0, DA-13759, World-wide, Version 1, Sep. 8, 2010, pp. 1-7.

*Primary Examiner* — Elmira Mehrmanesh
(74) *Attorney, Agent, or Firm* — Mattingly & Malur, PC

(57) ABSTRACT

A computer analyzes the root cause of an event, which has occurred in any of multiple management-target apparatuses, based on one or more rules in a storage device, that denote an association between one or more condition events corresponding to one or more events capable of occurring in any of the multiple management-target apparatuses and a conclusion event, which is the cause in a case where the one or more condition events have occurred. The computer, based on an event occurrence log including contents and an occurrence date and time of an event, determines a first event group, which is multiple events presumed to occur as a result of the same cause, creates a new rule in which the multiple events of the first event group are the condition events and one event of the first event group is the conclusion event, and stores the created new rule.

15 Claims, 19 Drawing Sheets

(56) References Cited

U.S. PATENT DOCUMENTS

| | | | | |
|---|---|---|---|---|
| 2009/0183031 | A1* | 7/2009 | Bethke et al. | 714/38 |
| 2009/0292948 | A1* | 11/2009 | Cinato et al. | 714/26 |
| 2010/0100775 | A1* | 4/2010 | Slutsman et al. | 714/47 |
| 2010/0325493 | A1* | 12/2010 | Morimura et al. | 714/39 |
| 2011/0055138 | A1* | 3/2011 | Khanduja et al. | 706/47 |
| 2011/0145647 | A1 | 6/2011 | Hidaka et al. | |
| 2012/0017127 | A1* | 1/2012 | Nagai et al. | 714/57 |
| 2012/0102362 | A1* | 4/2012 | Onitsuka et al. | 714/37 |

* cited by examiner

Fig. 5

Apparatus performance management table 33100

| Apparatus ID (33110) | Device ID (33120) | Metrics (33130) | Equipment OS (33140) | Performance value (33150) | Alert execute threshold (33160) | Thres hold type (33170) | Status (33180) |
|---|---|---|---|---|---|---|---|
| SYS1 | CTL1 | Operating rate | - | 40(%) | 20(%) | Upper limit | Threshold abnormali ty |
| SYS1 | CTL2 | Operating rate | - | 60(%) | 80(%) | Upper limit | Normal |
| SYS1 | LU1 | I/Os per unit of time | - | 300(IOPS) | 1000 (IOPS) | Upper limit | Normal |
| SYS1 | LU2 | I/Os per unit of time | - | 400(IOPS) | 1000 (IOPS) | Upper limit | Normal |
| HOST1 | /var | Response time | Linux | 5(msec) | 10 (msec) | Upper limit | Normal |
| HOST1 | /opt | Response time | Linux | 5(msec) | 10 (msec) | Upper limit | Normal |
| HOST2 | E: | Response time | Windows | 5(msec) | 10 (msec) | Upper limit | Normal |
| HOST3 | E: | Response time | Windows | 15(msec) | 10 (msec) | Upper limit | Normal |
| : | : | : | : | : | : | : | : |

Fig. 6

Volume topology management table 33200

| Apparatus ID (33210) | Volume ID (33220) | LU number (33230) | Controller name (33240) | Connecting-destination host ID (33250) | Connecting-destination drive name (33260) |
|---|---|---|---|---|---|
| SYS1 | VOL1 | LU1 | CTL1 | HOST1 | /var |
| | VOL1 | LU1 | CTL2 | HOST1 | /opt |
| | VOL2 | LU2 | CTL3 | HOST2 | E: |
| | VOL5 | LU3 | CTL4 | HOST3 | E: |
| : | : | : | : | : | : |

Fig. 7

Event management table 33300

| Event ID (33310) | Apparatus ID (33320) | Apparatus component ID (33330) | Metrics (33340) | Equipment OS (33350) | Status (33360) | Analyzed flag (33370) | Occurrence date/time (33380) |
|---|---|---|---|---|---|---|---|
| EV1 | SYS1 | CTL1 | Operating rate | - | Threshold abnormality | No | 2010-01-01 15:05:00 |
| EV2 | SYS1 | CTL3 | Operating rate | - | Threshold abnormality | No | 2010-01-01 15:00:00 |
| EV3 | SYS1 | LU1 | I/Os per unit of time | - | Threshold abnormality | No | 2010-01-01 15:05:00 |
| EV4 | SYS1 | LU2 | I/Os per unit of time | - | Threshold abnormality | No | 2010-01-01 15:00:00 |
| EV5 | SYS1 | LU3 | I/Os per unit of time | - | Threshold abnormality | No | 2010-01-01 15:05:00 |
| EV6 | HOST1 | /var | Response time | Linux | Threshold abnormality | No | 2010-01-01 15:05:00 |
| EV7 | HOST1 | /opt | Response time | Linux | Threshold abnormality | No | 2010-01-01 15:05:00 |
| EV8 | HOST2 | E: | Response time | Windows | Threshold abnormality | No | 2010-01-01 15:00:00 |
| EV9 | HOST3 | E: | Response time | Windows | Threshold abnormality | No | 2010-01-01 15:05:00 |
| : | : | : | : | : | : | : | : |

Fig. 8

General rule: Rule 1

| | | Apparatus type | Apparatus component type | Metrics | Status |
|---|---|---|---|---|---|
| 33410 | Condition part | Host computer | Drive | Response time | Threshold abnormality |
| | | Storage apparatus | LU | I/Os per unit of time | Threshold abnormality |
| 33420 | Conclusion part | Storage apparatus | LU | I/Os per unit of time | Bottleneck |
| 33430 | General rule ID | Rule1 | | | |
| 33440 | Applied topology | Volume topology management table | | | |

Fig. 9A

Expanded rule: ExRule 1-1

| | | Apparatus ID | Apparatus component ID | Metrics | Status |
|---|---|---|---|---|---|
| 33510 | Condition part | HOST1 | /var | Response time | Threshold abnormality |
| | | SYS1 | LU1 | I/Os per unit of time | Threshold abnormality |
| 33520 | Conclusion part | SYS1 | LU1 | I/Os per unit of time | Bottleneck |
| 33530 | Expanded rule ID | ExRule1-1 | | | |
| 33540 | Pre-expansion general rule ID | Rule-1 | | | |

Fig. 9B

Expanded rule: ExRule 1-2

| | | Apparatus ID | Apparatus component ID | Metrics | Status |
|---|---|---|---|---|---|
| 33510 | Condition part | HOST1 | /opt | Response time | Threshold abnormality |
| | | SYS1 | LU1 | I/Os per unit of time | Threshold abnormality |
| 33520 | Conclusion part | SYS1 | LU1 | I/Os per unit of time | Bottleneck |
| 33530 | Expanded rule ID | ExRule1-2 | | | |
| 33540 | Pre-expansion general rule ID | Rule-1 | | | |

Fig. 9C

Expanded rule: ExRule 1-3

| | | Apparatus ID | Apparatus component ID | Metrics | Status |
|---|---|---|---|---|---|
| 33510 | Condition part | HOST2 | E: | Response time | Threshold abnormality |
| | | SYS1 | LU2 | I/Os per unit of time | Threshold abnormality |
| 33520 | Conclusion part | SYS1 | LU2 | I/Os per unit of time | Bottleneck |
| 33530 | Expanded rule ID | ExRule1-3 | | | |
| 33540 | Pre-expansion general rule ID | Rule-1 | | | |

Fig. 9D

Expanded rule: ExRule 1-4

| | | Apparatus ID | Apparatus component ID | Metrics | Status |
|---|---|---|---|---|---|
| 33510 | Condition part | HOST3 | E: | Response time | Threshold abnormality |
| | | SYS1 | LU3 | I/Os per unit of time | Threshold abnormality |
| 33520 | Conclusion part | SYS1 | LU3 | I/Os per unit of time | Bottleneck |
| 33530 | Expanded rule ID | ExRule1-4 | | | |
| 33540 | Pre-expansion general rule ID | Rule-1 | | | |

Fig. 10

Analysis result management table 33600

| Cause apparatus ID (33610) | Cause component ID (33620) | Metrics (33630) | Certainty factor (33640) | Expanded rule ID (33650) | Received event ID (33660) | Action-taken flag (33670) | Analysis execution date/time (33680) |
|---|---|---|---|---|---|---|---|
| SYS1 | LU1 | I/Os per unit of time | 2/2 | ExRule1-1 | EV3<br>EV6 | No | 2010-01-01 15:05:00 |
| SYS1 | LU1 | I/Os per unit of time | 2/2 | ExRule1-2 | EV3<br>EV7 | No | 2010-01-01 15:05:00 |
| SYS1 | LU2 | I/Os per unit of time | 2/2 | ExRule1-3 | EV4<br>EV8 | No | 2010-01-01 15:00:00 |
| SYS1 | LU3 | I/Os per unit of time | 2/2 | ExRule1-4 | EV5<br>EV9 | No | 2010-01-01 15:05:00 |
| : | : | : | : | : | : | : | : |

Figure 16:
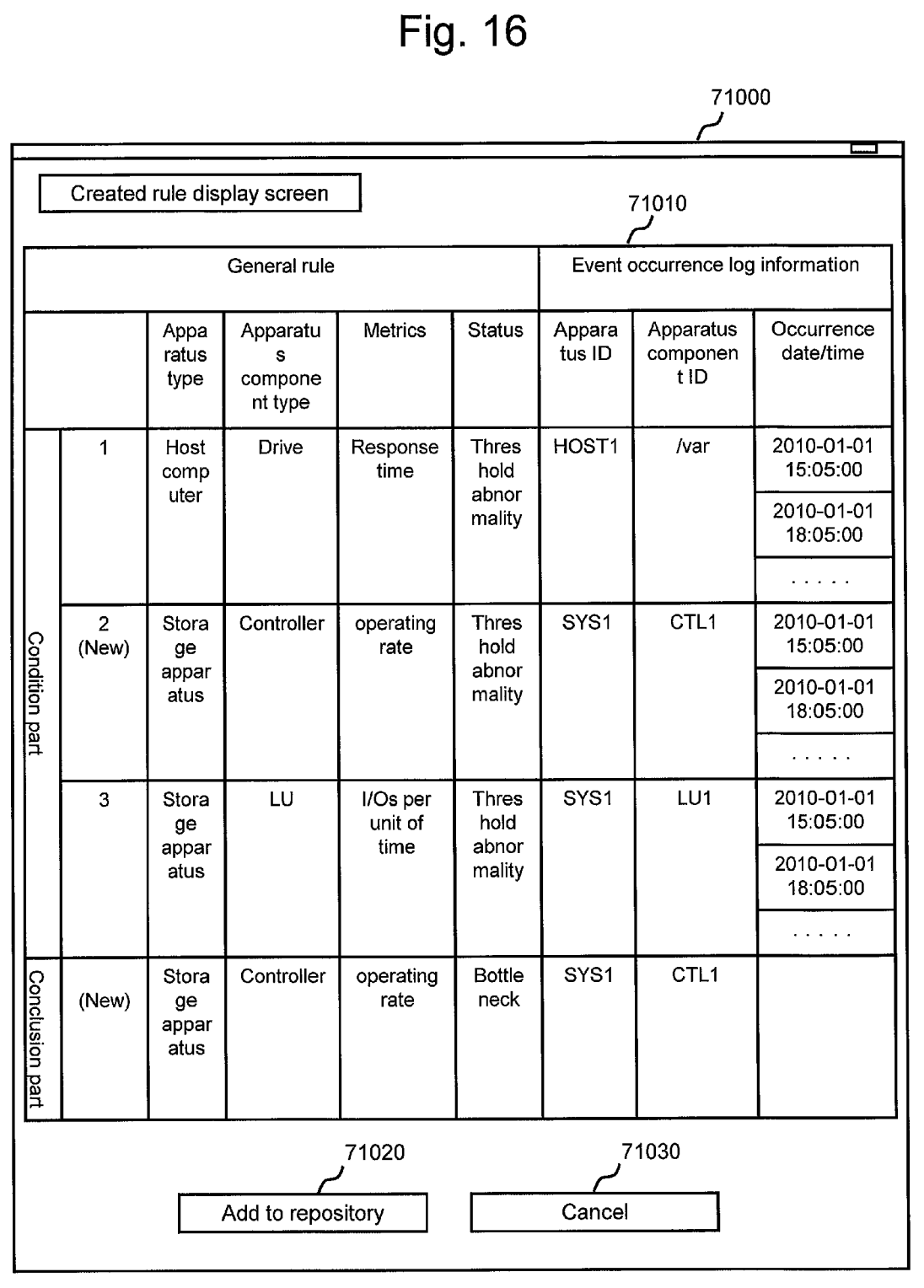

Created rule display screen

71010

| | | General rule | | | | Event occurrence log information | | |
|---|---|---|---|---|---|---|---|---|
| | | Apparatus type | Apparatus component type | Metrics | Status | Apparatus ID | Apparatus component ID | Occurrence date/time |
| Condition part | 1 | Host computer | Drive | Response time | Threshold abnormality | HOST1 | /var | 2010-01-01 15:05:00<br>2010-01-01 18:05:00<br>. . . . . |
| Condition part | 2 (New) | Storage apparatus | Controller | operating rate | Threshold abnormality | SYS1 | CTL1 | 2010-01-01 15:05:00<br>2010-01-01 18:05:00<br>. . . . . |
| Condition part | 3 | Storage apparatus | LU | I/Os per unit of time | Threshold abnormality | SYS1 | LU1 | 2010-01-01 15:05:00<br>2010-01-01 18:05:00<br>. . . . . |
| Conclusion part | (New) | Storage apparatus | Controller | operating rate | Bottleneck | SYS1 | CTL1 | |

71020 Add to repository

71030 Cancel

Figure 19:
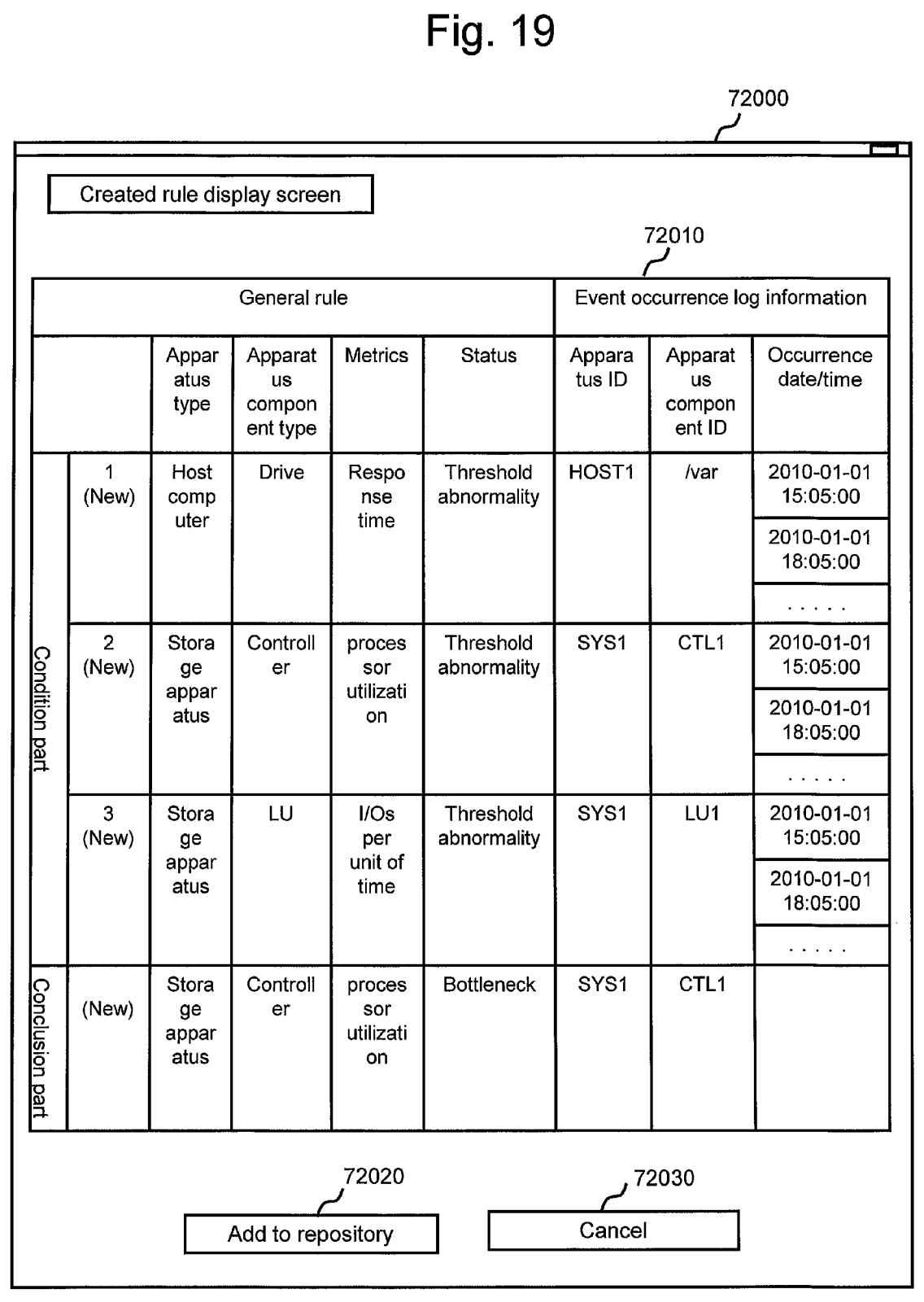

Created rule display screen

72010

| | | General rule | | | | Event occurrence log information | | |
|---|---|---|---|---|---|---|---|---|
| | | Apparatus type | Apparatus component type | Metrics | Status | Apparatus ID | Apparatus component ID | Occurrence date/time |
| Condition part | 1 (New) | Host computer | Drive | Response time | Threshold abnormality | HOST1 | /var | 2010-01-01 15:05:00<br>2010-01-01 18:05:00<br>. . . . . |
| Condition part | 2 (New) | Storage apparatus | Controller | processor utilization | Threshold abnormality | SYS1 | CTL1 | 2010-01-01 15:05:00<br>2010-01-01 18:05:00<br>. . . . . |
| Condition part | 3 (New) | Storage apparatus | LU | I/Os per unit of time | Threshold abnormality | SYS1 | LU1 | 2010-01-01 15:05:00<br>2010-01-01 18:05:00<br>. . . . . |
| Conclusion part | (New) | Storage apparatus | Controller | processor utilization | Bottleneck | SYS1 | CTL1 | |

72020 Add to repository

72030 Cancel

METHOD AND SYSTEM FOR SUPPORTING EVENT ROOT CAUSE ANALYSIS

TECHNICAL FIELD

The present invention relates to analysis of the root cause of an incident (an incident related to a failure or the like, referred to hereinafter as "event"), which has occurred in a management-target apparatus.

BACKGROUND ART

As described in Patent Literature 1, for example, when managing a computer system, an incident (event), which constitutes a cause, is detected from among multiple failures or the symptoms thereof detected in the system. Specifically, Patent Literature 1 discloses technology, which uses management software, treats a performance value that exceeds a threshold in a management-target apparatus as the occurrence of an event, and stores event occurrence information in an event DB (database). The management software has an analysis engine for analyzing a causal relationship between multiple events, which have occurred in the management-target apparatus. The analysis engine accesses a configuration DB having management-target apparatus inventory information, recognizes a component within a piece of equipment, which is on the path of an I/O (Input/Output) route, and recognizes components capable of affecting the performance of a logical volume on a host as a group called a "topology". Then, the analysis engine applies an analysis rule comprising a predetermined condition statement and an analysis result to each topology when an event occurs, and constructs an expanded rule. The expanded rule includes a conclusion event, which could be the root cause, and, in a case where the conclusion event has occurred, a condition event group, which is produced thereby. Specifically, the event described in the THEN part of the rule is the conclusion event, which could be the root cause, and the event described in the IF part of the rule is the condition event.

CITATION LIST

Patent Literature

[PTL 1]
U.S. Pat. No. 7,107,185
[PTL 2]
Japanese Patent Application Laid-open No. 2010-191914

SUMMARY OF INVENTION

Technical Problem

In the failure analysis system disclosed in Patent Literature 1, the corresponding relationship between a combination of events capable of occurring in the management-target apparatus (the condition event group) and a failure cause candidate (the conclusion event) are defined as an IF-THEN rule. The failure analysis system calculates the probability of a cause candidate described in the THEN part of the rule by computing an incidence of a condition event described in the IF part of the rule. The cause candidate and the calculated probability are displayed via a GUI (Graphical User Interface) in accordance with a user request. This makes it possible for the user to learn what kind of failure caused the occurrence of the received event.

However, in a conventional failure analysis system like this, it is not possible to display an appropriate analysis result for the user unless an IF-THEN rule for analyzing a failure exists in advance. That is, an analysis cannot be properly implemented unless a rule corresponding to the received event has been prepared beforehand. Thus, in order to use the failure analysis function effectively, it is necessary to assume in advance a failure, which could occur in a computer system in which the failure analysis function is scheduled to be used, and an event, which could occur as the cause of this failure. However, this is a difficult task, and increases the workload of the operations administrator, who is the user.

In the failure analysis system disclosed in Patent Literature 1, failure analysis is implemented after creating a rule beforehand. In other words, analysis can only be implemented for a failure, which has been assumed in advance. This manifests a case in which the user is able to a certain degree to assume in advance a failure that will occur, and the operations administrator normally creates a rule based on past event occurrence situations. However, as mentioned above, the workload of the operations administrator increases and human error could occur at rule creation time.

A pattern extraction device disclosed in Patent Literature 2 receives a set, which includes at least one item, and extracts a characteristic pattern, which is characteristic of a pattern in an item included thereamong.

This method analyzes a received situation of a past event and extracts an event occurrence pattern capable of being made into a rule. With this in mind, first of all, since analysis targeted at the occurrence of a failure is not implemented in the failure analysis system, it is not possible to create a rule for failure analysis even though an event occurrence pattern has been extracted. Furthermore, in the method of Patent Literature 2, a pattern, which was extracted in the past, is not used at pattern extraction time. That is, in the method of Patent Literature 2, the failure analysis system is not able to automatically create a rule to be provided beforehand based on a past failure occurrence situation.

Solution to Problem

A computer analyzes the root cause of an event, which occurred in any of multiple management-target apparatuses, based on one or more rules in a storage device, that denote an association between one or more condition events corresponding to one or more events capable of occurring in any of the multiple management-target apparatuses and a conclusion event, which is the cause in a case where the above-mentioned one or more condition events have occurred. The computer, based on an event occurrence log including contents and an occurrence date and time of an event which has occurred, determines a first event group, which is multiple events presumed to occur as a result of the same cause, creates a new rule in which the multiple events of the first event group are the condition events and one event of the first event group is the conclusion event, and stores the created new rule in the above-mentioned storage device. The event occurrence log may be stored in the above-mentioned storage device.

BRIEF DESCRIPTION OF DRAWINGS

FIG. 5 is a diagram showing an example of the configuration of an apparatus performance management table related to the first embodiment.

FIG. 6 is a diagram showing an example of the configuration of a volume topology management table related to the first embodiment.

FIG. 7 is a diagram showing an example of the configuration of an event management table related to the first embodiment.

FIG. 8 is a diagram showing an example of the configuration of a general rule related to the first embodiment.

FIG. 9A is a diagram showing an example of a first configuration of an expanded rule related to the first embodiment.

FIG. 9B is a diagram showing an example of a second configuration of an expanded rule related to the first embodiment.

FIG. 9C is a diagram showing an example of a third configuration of an expanded rule related to the first embodiment.

FIG. 9D is a diagram showing an example of a fourth configuration of an expanded rule related to the first embodiment.

FIG. 10 is a diagram showing an example of the configuration of an analysis result management table related to the first embodiment.

FIG. 16 is a diagram showing an example of the configuration of a created rule display screen related to the first embodiment.

FIG. 19 is a diagram showing an example of the configuration of a created rule display screen related to the second embodiment.

DESCRIPTION OF EMBODIMENTS

Figure 1:
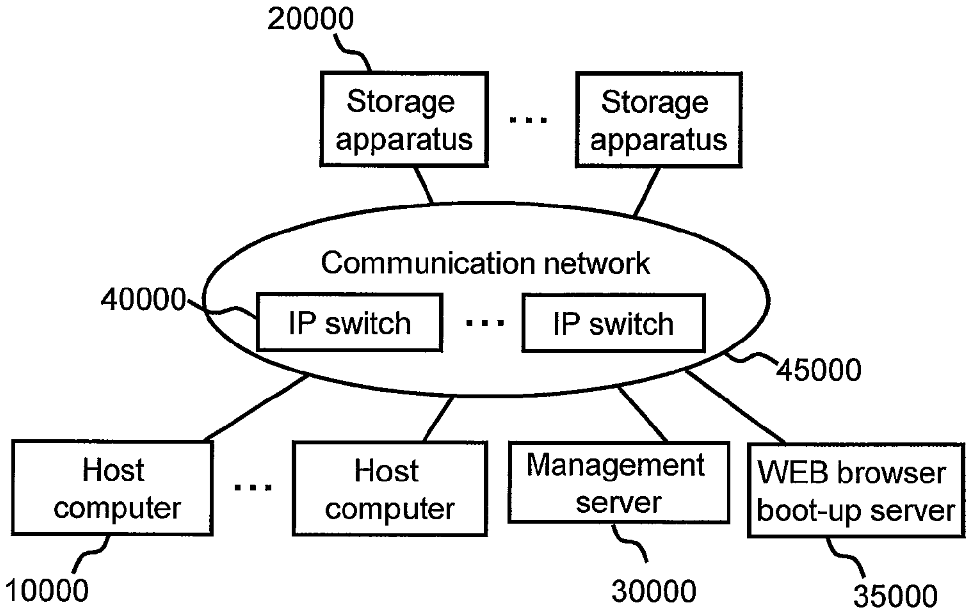
FIG. 1 is a diagram showing an example of the configuration of a computer system related to a first embodiment.

The embodiments relate to the analysis of the cause of a failure and the creation of an analysis rule therefor for resolving a failure in a computer system.

A number of embodiments will be explained by referring to the drawings. The embodiments explained below do not limit the invention related to the claims, and not all of the elements and combinations thereof explained in the embodiments are essential for the solution provided by the invention. In the drawings, the same reference signs denote the same components throughout the multiple drawings.

In the following explanation, information on the present invention is explained using the expression "aaa table", but this information may also be expressed by other than data structures, such as a list, a DB, and a queue. Thus, to show that the information is not dependent on the data structure, "aaa table" may be called "aaa information".

When explaining the contents of the respective information, the expressions "identification information", "identifier", "name" and "ID" are used, but these expressions are interchangeable.

In the following explanation, there may be cases where an explanation is given using a "program" or a "module" as the doer of the action, but since the stipulated processing is performed in accordance with a program or a module being executed by a processor while using a memory and a communication port (an I/O port or the like), the explanation may also give the processor as the doer of the action. A process, which is disclosed as having a program or a module as the doer of the action, may be regarded as a process performed by a management server or other such computer. Furthermore, either all or a portion of a program may be realized in accordance with dedicated hardware. Various types of programs may be installed in respective computers using a program delivery server or storage media.

In the embodiments described in the specification, no mention is made as to the size of the system regarded as the management target. However, for a larger size management-target system, opportunities for performing failure analysis increase in accordance with managing the management-target system by partitioning this system into small-size units. Thus, in a case where these embodiments are applied to a large-size system, the effects of the embodiments will be even greater.

[Embodiment 1]

The first embodiment relates to a failure cause candidate display process in accordance with management software (included in a management server, for example).

<System Configuration>

FIG. 1 is a diagram showing an example of the configuration of a computer system related to the first embodiment.

The computer system comprises one or more storage apparatuses 20000, one or more host computers 10000, a management server 30000, a WEB browser boot-up server 35000, and one or more IP switches 40000, and is configured such that these elements are connected via a LAN (Local Area Network) or other such communication network (hereinafter, simply referred to as "network") 45000. The computer system, for example, may comprise a NAS (Network Attached Storage), a file server, a printer, and so forth.

The host computer 10000, for example, receives a file I/O request from a connected client computer not shown in the drawing, and accesses the storage apparatus 20000 based on the received I/O request. The management server 30000 manages the operations of the entire computer system.

The WEB browser boot-up server 35000 communicates via the network 45000 with a below-described GUI display processing module 32400 of the management server 30000 (refer to FIG. 4), and displays various types of information on a screen of the WEB browser. A user manages an apparatus in the computer system by referencing information displayed on the WEB browser screen on the WEB browser boot-up server 35000. However, the management server 30000 may comprise the functions of the WEB browser boot-up server 35000.

Hereinbelow, an apparatus comprising the computer system (the host computer 10000, the storage apparatus 20000, the IP switch 40000 and so forth) may be called a "node apparatus". A node apparatus, which is targeted for management by the management server 30000, may be called a "management-target apparatus" hereinbelow.

<Internal Configuration of Host Computer>

Figure 2:
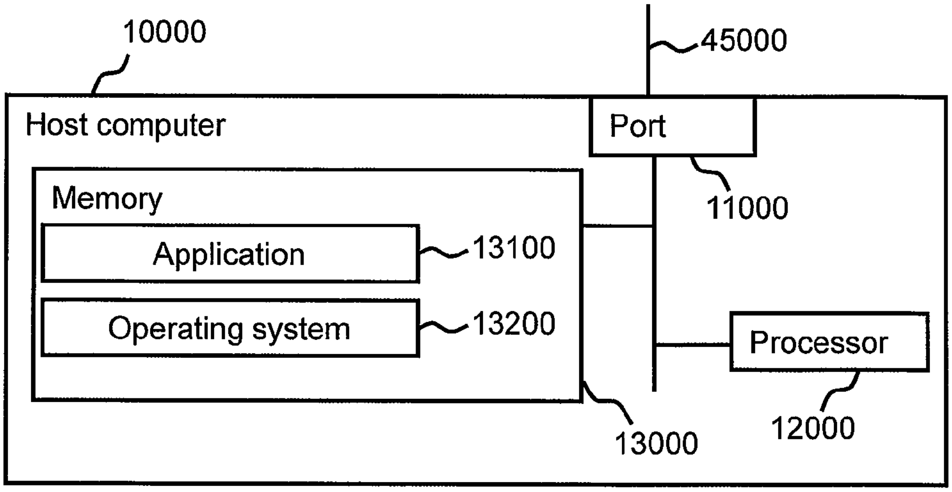
FIG. 2 is a diagram showing an example of the configuration of a host computer related to the first embodiment.

FIG. 2 is a diagram showing an example of the configuration of a host computer related to the first embodiment.

The host computer 10000 comprises a port 11000 for connecting to the network 45000, a processor 12000, and a memory 13000, and is configured such that these elements are connected to one another via an internal bus or other such circuit. The host computer 10000 may comprise a disk device.

A business application 13100 and an operating system 13200 are stored in the memory 13000.

The business application 13100 uses a storage area provided from the operating system 13200, and inputs/outputs (I/O) data to/from the relevant storage area.

The operating system 13200 executes a process for allowing the business application 13100 to recognize a volume 24100 on a storage apparatus 20000 connected via the network 45000 as a storage area.

The port 11000 includes an I/O port for carrying out communications with the storage apparatus 20000 using an iSCSI (Internet Small Computer System Interface), and a management port for the management server 30000 to acquire management information in the host computer 10000. The I/O port and the management port may be separate devices.

<Internal Configuration of Storage Apparatus>

Figure 3:
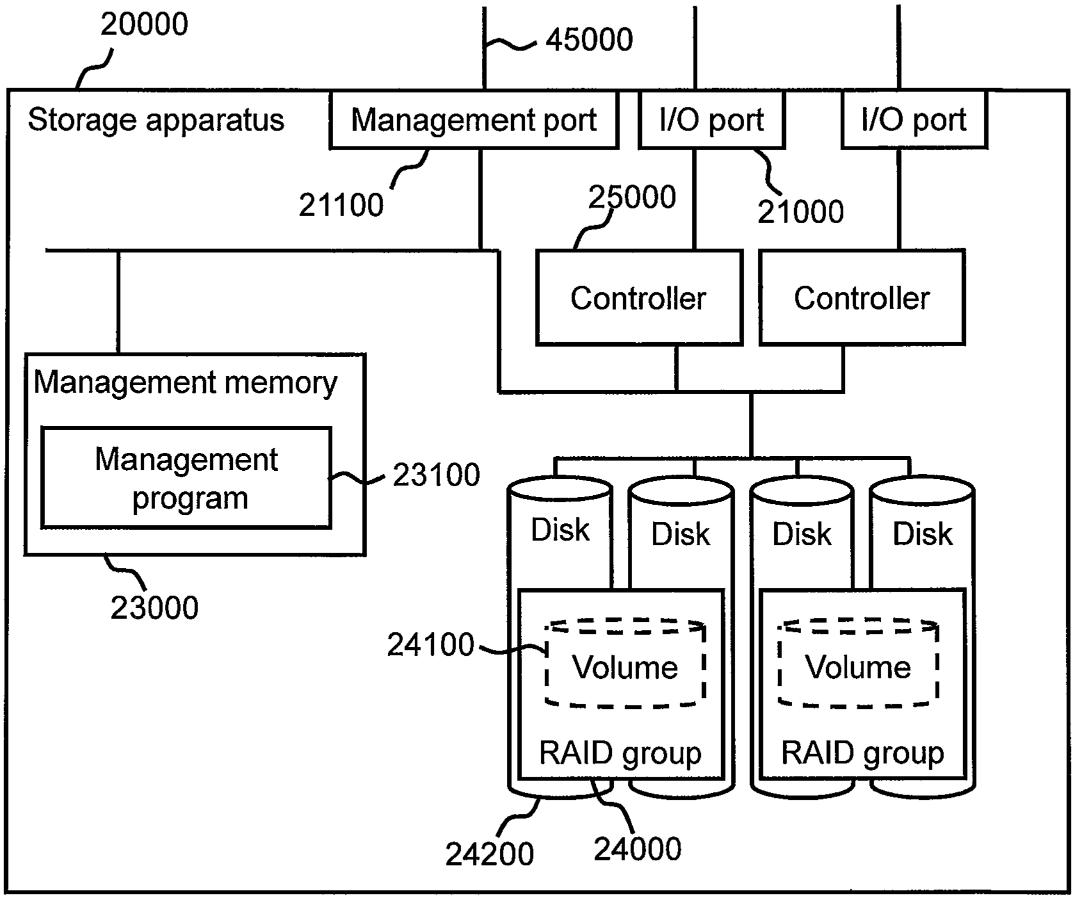
FIG. 3 is a diagram showing an example of the configuration of a storage apparatus related to the first embodiment.

FIG. 3 is a diagram showing an example of the configuration of a storage apparatus related to the first embodiment.

The storage apparatus 20000 comprises one or more I/O ports 21000 for connecting to the host computer 10000 via the network 45000, a management port 21100 for connecting to the management server 30000 via the network 45000, a management memory 23000 for storing various types of management information, one or more RAID (Redundant Arrays of Inexpensive Disks) groups 24000 for storing data, and one or more controllers 25000 for controlling data and the management information in the management memory 23000, and is configured such that these elements are connected to one another via an internal bus or other such circuit. The connecting of the RAID group 24000 more accurately points to the fact that multiple storage devices (in this embodiment, magnetic disks 24200), which comprise the RAID group 24000, are connected to another component.

The management memory 23000 stores a management program 23100 for managing the storage apparatus 20000. The management program 23100 communicates with the management server 30000 by way of the management port 21100, and provides configuration management information of the storage apparatus 20000 to the management server 30000.

The RAID group 24000 is configured using either one or multiple magnetic disks 24200. In a case where the RAID group 24000 is configured using multiple magnetic disks 24200, these magnetic disks 24200 may form a RAID configuration. The RAID group 24000 is also logically partitioned into multiple volumes 24100.

A RAID configuration need not be formed in a case where the volume 24100 is configured using the storage area of one or more magnetic disks 24200. In addition, a flash memory or other such storage medium may be used instead of the magnetic disk 24200 as the storage device for providing the storage area corresponding to the volume 24100.

The controller 25000 includes on the inside thereof a processor for controlling the storage apparatus 20000 and a cache memory for temporarily storing data exchanged with the host computer 10000. The controller 25000 lies between the I/O port 21000 and the RAID group 24000, and transfers data between the two.

As long as the storage apparatus 20000 includes a controller 25000 for providing a volume 24100 to any of the host computers 10000, receiving an access request (I/O request), and performing a read/write from/to a storage device in accordance with the received access request, and a storage device for providing a storage area, the configuration of the storage apparatus 20000 may differ from that of this embodiment, and, for example, the controller 25000 and storage device, which provides the storage area, may be stored in different enclosures. In the example of FIG. 3, the management memory 23000 and the controller 25000 are disposed as separate configurations, but these elements may constitute an integrated configuration. In this embodiment, as an expression, which encompasses a case in which the controller 25000 and the storage device exist in the same enclosure as well as a case in which each exists in a different enclosure, the storage apparatus 20000 may be called a storage system.

<Internal Configuration of Management Server>

Figure 4:
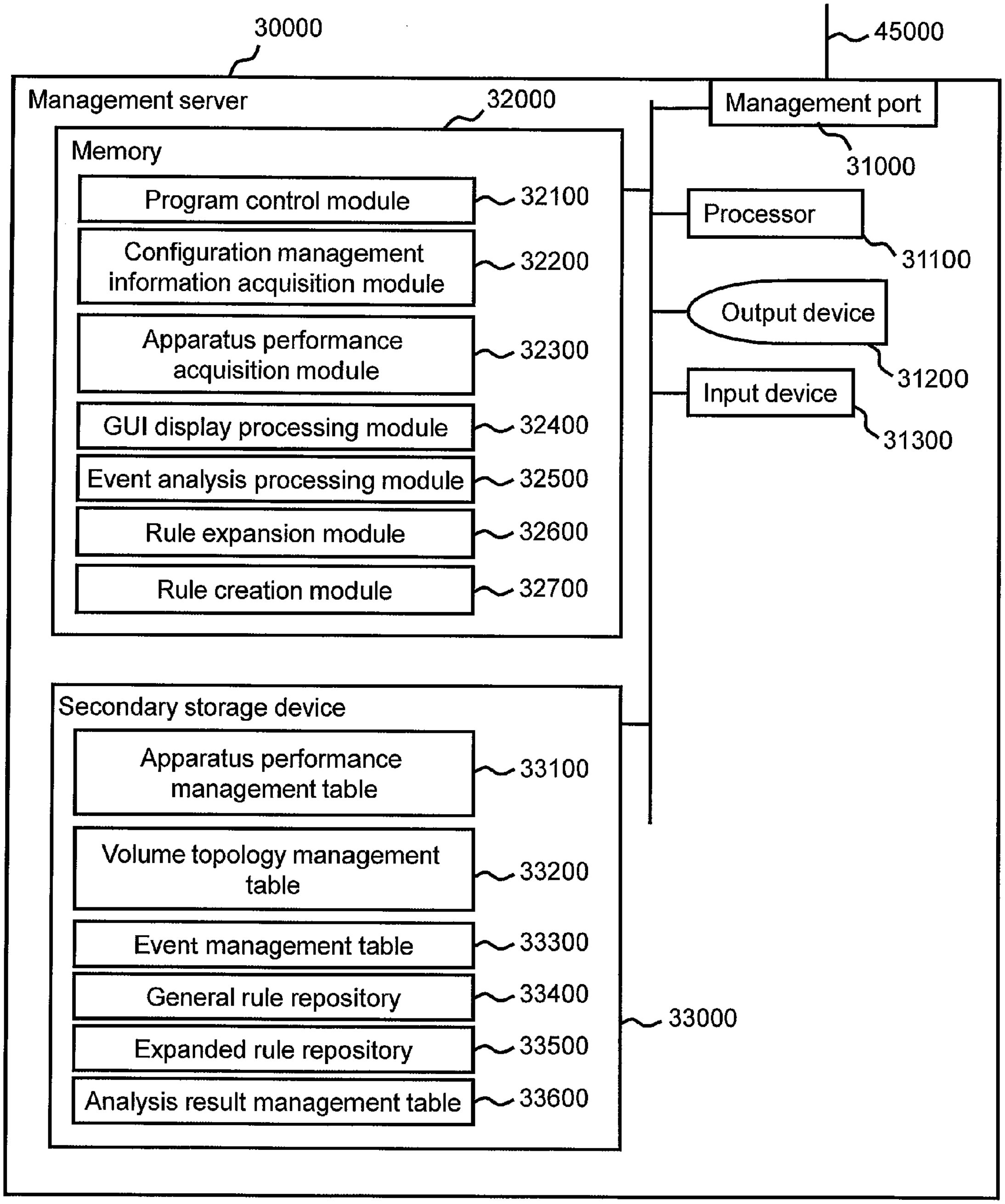
FIG. 4 is a diagram showing an example of the configuration of a management server related to the first embodiment.

FIG. 4 is a diagram showing an example of the configuration of a management server related to the first embodiment. The management server 30000 is a computer for managing a management-target apparatus and analyzing the root cause of an event, which has occurred in the management-target apparatus. The management server 30000 comprises a management port 31000 for connecting to the network 45000, a processor 31100, a cache memory or other such memory 32000, a secondary storage device (secondary storage area) 33000, such as a HDD (Hard Disk Drive), a display device or other such output device 31200 for outputting a processing result, and a keyboard or other such input device 31300 for a storage administrator to input an indication, and is configured such that these elements are connected to one another via an internal bus or other such circuit.

The memory 32000 stores a program control module 32100, a configuration management information acquisition module 32200, an apparatus performance acquisition module 32300, a GUI display processing module 32400, an event analysis processing module 32500, a rule expansion module 32600, and a rule creation module 32700. In this embodiment, the respective modules 32100 through 32700 are provided as software modules, but may be provided as hardware modules. The processes performed by the respective modules 32100 through 32700 may be provided as one or more program codes, and a clear boundary need not exist between the modules 32100 through 32700. A module can be considered to be a program.

The secondary storage area 33000 stores an apparatus performance management table 33100, a volume topology management table 33200, an event management table 33300, a general rule repository 33400, an expanded rule repository 33500, and an analysis result management table 33600. The secondary storage area 33000, for example, comprises either a semiconductor memory or a magnetic disk, or a semiconductor memory and a magnetic disk. The general rule repository 33400 includes one or more general rules, and the expanded rule repository 33500 includes one or more expanded rules.

The GUI display processing module 32400 performs various processing in accordance with a request received from an administrator via the input device 31300, and displays the processing result and configuration management information via the output device 31200. The input device 31300 and the output device 31200 may be separate devices, or may be one or more integrated devices.

The management server 30000, for example, comprises a keyboard, a pointer device and so forth as the input device 31300, and a display, a printer and the like as the output device 31200, but the input device 31300 and the output device 31200 may be devices other than these elements. Also, a serial interface or an Ethernet interface may be used as an alternative to the input device 31200 and the output device 31300, a computer for display use comprising a display, a keyboard, and a pointer device may be connected to the relevant interface, and by sending display information to the display computer and receiving input information from the display computer, the relevant interface may substitute for the functions of the input device 31200 and the output device 31300 by carrying out a display and receiving input on the display computer.

In this embodiment, a set of one or more computers, which manages the computer system and displays the display information may be called a management system. In a case where the management server 30000 displays the display information, the management server 30000 is the management system, and in a case where the display computer (for example, the WEB browser boot-up server 35000) displays the display information, a combination of the management server 30000 and the display computer are the management system. Furthermore, in a case where the same processing as that of the management server 30000 is realized using multiple computers for increasing the speed and the reliability of the management process, the relevant multiple computers (may include a display computer in a case where a display computer performs a display) are the management system.

<Configuration of Apparatus Performance Management Table>

FIG. 5 is a diagram showing an example of the configuration of an apparatus performance management table related to the first embodiment.

The apparatus performance management table 33100 includes as configuration items a field 33110 for storing an apparatus ID, which is the identifier of the management-target apparatus, a field 33120 for storing a device ID, which is the identifier of a device (a physical or logical device, for example, the controller 25000, the volume 24100, or a logical volume of the host computer 10000, hereinafter referred to as "management-target device") inside the management-target apparatus, a field 33130 for storing data (referred to hereinafter as "metric name") denoting a benchmark for the performance of a management-target device, a field 33140 for storing the type of OS (Operating System) mounted in the management-target apparatus, a field 33150 for storing a performance value of the management-target device, which is acquired from the relevant apparatus, a field 33160 for storing a threshold (referred to hereinafter as "alert execute threshold"), which is either an upper limit or a lower limit of a normal range of performance values of the management-target device and is acquired by receiving an input from the user, a field 33170 for storing a threshold type denoting whether the alert execute threshold is the upper limit or the lower limit of normal values, and a field 33180 for storing data denoting the status of the management-target device, that is, whether the performance value is a normal value or an abnormal value.

For example, it is clear from the first row (first entry) of FIG. 5 that a controller 25000 having the device ID "CTL 1" in a storage apparatus 20000 having the apparatus ID "SYS 1" is in a state in which an abnormality has occurred as indicated by the fact that the operating rate of the processor is currently 40%, and the alert execute threshold is 20%, that is, overload (abnormal) is determined when the operating rate exceeds 20%. In this embodiment, for example, a change in the status of the management-target device, that is, the fact that the performance value exceeds the alert execute threshold and transitions to an abnormal value, or the fact that the performance value returns to a normal value corresponds to the occurrence of an event. For example, the fact that the performance value exceeds the alert execute threshold and transitions to an abnormal value alone may be regarded as the occurrence of an event.

I/Os per unit of time, operating rate, and response time are given here as examples of benchmarks, which the management server 30000 uses to determine the performance of the management-target device, but another benchmark may be employed.

<Configuration of Volume Topology Management Table>

FIG. 6 is a diagram showing an example of the configuration of a volume topology management table related to the first embodiment.

The volume topology management table 33200 includes as configuration items a field 33210 for storing the apparatus ID of a storage apparatus 20000, a field 33220 for storing a volume ID, which is the identifier of a volume 24100 of the storage apparatus 20000, a field 33230 for storing a LU (Logical Unit) number, which the host computer 10000 uses when accessing the volume 24100 and which is the identifier of the volume 24100, a field 32340 for storing the ID of the controller 25000 used when accessing the volume 24100, a field 33250 for storing the identifier of the host computer 10000, which is connected to the volume 24100, that is, which is able to access the volume 24100, and a field 33260 for storing the drive name of a logical volume of the host computer 10000 for which the volume 24100 constitutes the entity. That is, the volume topology management table 33200 shows the connecting relationship between the host computer 10000 and the storage apparatus 20000, more specifically, the connecting relationship between a logical volume of the host computer 10000 and the controller 25000 and the volume 24100 of the storage apparatus 20000.

For example, it is clear from the first row (first entry) of FIG. 6 that a storage apparatus having the apparatus ID "SYS 1" provides a volume having the volume ID "VOL 1" to a host computer having the connecting-destination host ID "HOST 1" as the logical volume "LU 1", the relevant volume is connected to the host computer "HOST 1" via a controller having the controller name "CTL 1", and the drive name of the relevant logical volume on the host apparatus "HOST 1" is recognized as "/var".

<Configuration of Event Management Table>

FIG. 7 is a diagram showing an example of the configuration of an event management table related to the first embodiment.

The event management table 33300 is referenced as needed in a failure cause analysis process and a rule creation process, which will be described further below. The event management table 33300 includes as configuration items a field 33310 for storing an event ID, which is the identifier of the event itself, a field 33320 for storing the apparatus ID of the event-origin management-target apparatus, a field 33330 for storing the identifier of the event-origin management-target device (apparatus component), a field 33340 for storing a metric name related to the event (threshold abnormality), a field 33350 for storing the type of OS mounted in the event-origin management-target apparatus, a field 33360 for storing the state of the event-origin management-target device at the time the event occurred, a field 33370 for storing data (referred to hereinafter as "analyzed flag") denoting whether or not the event has been analyzed by the event analysis processing module 32500, and a field 33380 for storing the date and time at which the event occurred. The analyzed flag, for example, is configured to "Yes" in a case where the event has been analyzed by the event analysis processing module 32500, and is configured to "No" in a case where the event has not yet been analyzed.

For example, it is clear from the first row (first entry) of FIG. 7 that the management server 30000 has detected a threshold abnormality, that is, an event of the processor operating rate in the controller denoted as "CTL 1" in the storage apparatus "SYS 1" at "2010-01-01 15:05:00", and that the event ID is "EV 1" and that the relevant event has yet to be analyzed.

<General Rule Configuration>

FIG. 8 is a diagram showing an example of the configuration of a general rule related to the first embodiment.

The general rule (the same holds true for an expanded rule described further below) denotes the corresponding relationship between one or more events (condition event), which could occur in a node apparatus comprising the computer system, and an event (conclusion event), which constitutes the cause in a case where the one or more condition events have occurred.

Generally speaking, an event propagation model for identifying the cause in a failure analysis uses an "IF-THEN" format to describe a combination of events, which are expected to occur as the result of a certain failure, and the cause thereof. The general rule is not limited to that shown in FIG. 8, and may be a rule of a different format.

The general rule includes as configuration items a field 33430 for storing a general rule ID, which is the identifier of the general rule, a field 33410 for storing information related to an observed incident, that is, a condition event, which corresponds to the IF part of the general rule described using the "IF-THEN" format, a field 33420 for storing information related to a causal incident, that is, a conclusion event, which corresponds to the THEN part of the general rule described using the "IF-THEN" format, and a field 33440 for storing a data name for managing a topology, which is used when associating the general rule with the configuration of the actual computer system and expanding this general rule to create an expanded rule. In a case where the event of the condition part 33410 (condition event) has been detected, the event of the conclusion part 33420 (conclusion event) constitutes the cause of the failure. Therefore, when the status of the conclusion part 33420 becomes normal, the condition part 33410 problem can also be expected to be resolved. In the example of FIG. 8, two events are defined in the condition part 33410, but the number of events may be one, or three or more.

For example, when a "response time threshold abnormality of the logical volume on the host computer 10000" and a " I/Os per unit of time threshold abnormality of the volume 24100 (written as "LU" in the drawing) in the storage apparatus 20000" are detected as observed incidents, the general rule "Rule 1" of FIG. 8 denotes that a "I/Os per unit of time bottleneck (threshold abnormality) of the volume 24100 in the storage apparatus 20000" is concluded to be the cause. Furthermore, the topology information of the volume topology management table 33200 is used when creating an expanded rule with respect to the general rule "Rule 1". The fact that a certain condition is normal may be defined as an event included in the observed incident.

<Expanded Rule Configuration>

FIG. 9A is a diagram showing an example of a first configuration of an expanded rule related to the first embodiment. FIG. 9B is a diagram showing an example of a second configuration of an expanded rule related to the first embodiment. FIG. 9C is a diagram showing an example of a third configuration of an expanded rule related to the first embodiment. FIG. 9D is a diagram showing an example of a fourth configuration of an expanded rule related to the first embodiment.

The expanded rule is information for expanding the general rule in a format, which depends on the actual configuration of the computer system. The expanded rules shown in FIGS. 9A through 9D are created by inserting each entry item of the volume topology management table 33200 into the general rule shown in FIG. 8.

The expanded rule includes as configuration items a field 33530 for storing an expanded rule ID, which is the identifier of an expanded rule, a field 33540 for storing the general rule ID of the general rule, which constitutes the basis of the expanded rule, a field 33510 for storing information related to an observed incident, that is, a condition event, which corresponds to the IF part of the expanded rule described using the "IF-THEN" format, and a field 33520 for storing information related to a causal incident, that is, a conclusion event, which corresponds to the THEN part of the expanded rule described using the "IF-THEN" format.

The expanded rule is created by taking into account the actual configuration of the computer system (for example, the connecting relationship shown in the volume topology management table 33200) and incorporating the apparatus type and apparatus component type of the general rule condition event and conclusion event into the identified management-target apparatus and management-target device. For example, the expanded rule "ExRule 1-1" of FIG. 9A is created by inserting into the apparatus type and the apparatus component type in the general rule "Rule 1" information (the controller name of field 33210, the host ID of field 33250, the connecting-destination drive name of field 33260, and the LU number of field 33230) identifying the logical volume "/var" on the host computer "HOST 1" and the volume "LU 1" in the storage apparatus "SYS 1", the connecting relationship of which is denoted by the topmost entry of the volume topology management table 33200 of FIG. 6. As is clear from FIG. 9A, the expanded rule "ExRule 1-1" is expanded based on the general rule "Rule 1", and when a "response time threshold abnormality of the logical volume '/var' on the host computer 'HOST 1'" and a "I/Os per unit of time threshold abnormality of the volume 'LU 1' in the storage apparatus 'SYS 1'" are detected as observed incidents, denotes that a "I/Os per unit of time bottleneck of the volume 'LU 1' in the storage apparatus 'SYS 1'" is concluded to be the cause.

Alternatively, the expanded rule "ExRule 1-2" of FIG. 9B is created by inserting into the apparatus type and the apparatus component type in the general rule "Rule 1" information identifying the logical volume "/opt" on the host computer "HOST 1" and the volume "LU 1" of the storage apparatus "SYS 1", the connecting relationship of which is denoted by the second entry of the volume topology management table 33200 of FIG. 6. As is clear from FIG. 9B, when a "response time threshold abnormality of the logical volume '/opt' on the host computer 'HOST 1'" and a "I/Os per unit of time threshold abnormality of the volume 'LU 1' in the storage apparatus 'SYS 1'" are detected, the expanded rule "ExRule 1-2" shows that a "I/Os per unit of time bottleneck of the volume 'LU 1' in the storage apparatus 'SYS 1'" is concluded to be the cause. Furthermore, the expanded rule "ExRule 1-3" of FIG. 9C is created by inserting into the apparatus type and the apparatus component type in the general rule "Rule 1" information identifying the logical volume "E:" on the host computer "HOST 2" and the volume "LU 2" of the storage apparatus "SYS 1", the connecting relationship of which is denoted by the third entry of the volume topology management table 33200 of FIG. 6. As is clear from FIG. 9C, when a "response time threshold abnormality of the logical volume 'E:' on the host computer 'HOST 2'" and a "I/Os per unit of time threshold abnormality of the volume 'LU 2' in the storage apparatus 'SYS 1'" are detected, the expanded rule "ExRule 1-3" shows that a "I/Os per unit of time bottleneck of the volume 'LU 2' in the storage apparatus ‘SYS 1’” is concluded to be the cause. In addition, the expanded rule “ExRule 1-4” of FIG. 9D is created by inserting into the apparatus type and the apparatus component type in the general rule “Rule 1” information identifying the logical volume “E:” on the host computer “HOST 3” and the volume “LU 3” of the storage apparatus “SYS 1”, the connecting relationship of which is denoted by the fourth entry of the volume topology management table 33200 of FIG. 6. As is clear from FIG. 9D, when a “response time threshold abnormality of the logical volume ‘E:’ on the host computer ‘HOST 3’” and a “I/Os per unit of time threshold abnormality of the volume ‘LU 3’ in the storage apparatus ‘SYS 1’” are detected, the expanded rule “ExRule 1-4” shows that a “I/Os per unit of time bottleneck of the volume ‘LU 3’ in the storage apparatus ‘SYS 1’” is concluded to be the cause.

<Configuration of Analysis Result Management Table>

FIG. 10 is a diagram showing an example of the configuration of an analysis result management table related to the first embodiment.

The analysis result management table 33600 includes as configuration items a field 33610 for storing the apparatus ID of an event-origin management-target apparatus determined to be the cause of a failure in the failure cause analysis process, a field 33620 for storing the identifier of the event-origin management-target device, a field 33630 for storing a metric name related to the event (threshold abnormality), a field 33640 for storing an index value (referred to as “certainty factor” hereinafter. In this embodiment, the certainty factor is the incidence of a condition event.) denoting the feasibility of the analysis result, a field 33650 for storing the expanded rule ID of the expanded rule constituting the grounds on which the event was determined to be the cause of the failure, a field 33660 for storing the ID of the event, which was actually received, from among the condition events of the expanded rule, a field 33670 for storing an action taken flag, denoting whether or not the administrator, who is the user, actually responded to the failure based on the relevant analysis result, and a field 33680 for storing a date and time (analysis execution date/time) at which the failure analysis process was started pursuant to the occurrence of an event.

For example, it is clear from the first row (first entry) of FIG. 10 that, based on the expanded rule “ExRule 1-1”, the management server 30000 determines the threshold abnormality of the “I/Os per unit of time of the volume ‘LU 1’ in the storage system ‘SYS 1’” as the cause of the failure, and receives events “EV 3” and “EV 6” as the grounds therefor, certainty factor of the condition event (incidence) is “2/2”, and the date and time at which analysis was executed is “2010-01-01 15:05:00”.

Next, the processing in the computer system related to this embodiment will be explained.

<Configuration Management Information Acquisition Process and Volume Topology Management Table Update Process>

The program control module 32100 of the management server 30000, for example, uses a polling process to instruct the configuration management information acquisition module 32200 to regularly acquire configuration management information from a management-target apparatus (in this embodiment, the storage apparatus 20000, the host computer 10000, and the IP switch 40000) in the computer system. The configuration management information shows the configuration of the management-target apparatus, and, specifically, is information showing what types of devices comprise the management-target apparatus, and which management-target apparatus or which device the management-target apparatus has a connecting relationship with.

The configuration management information acquisition module 32200 acquires configuration management information from a management-target apparatus (in this embodiment, the storage apparatus 20000, the host computer 10000, and the IP switch 40000) and updates the volume topology management table 33200.

<Apparatus Performance Information Acquisition Process and Event Analysis Process>

Figure 11:
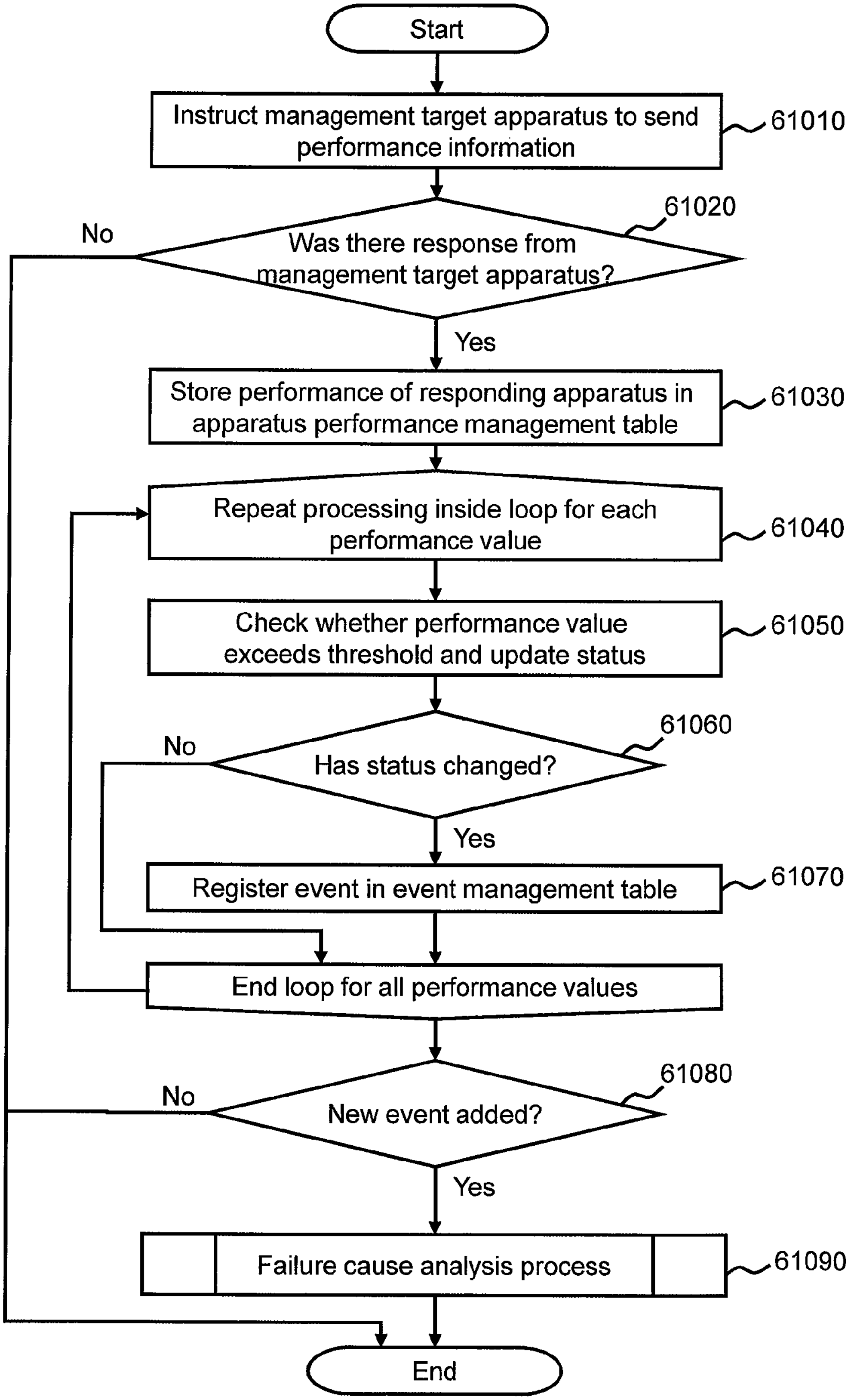
FIG. 11 is a flowchart of a performance information acquisition process related to the first embodiment.

FIG. 11 is a flowchart of an apparatus performance information acquisition process related to the first embodiment.

The program control module 32100 of the management server 30000 instructs the apparatus performance acquisition module 32300 to execute the apparatus performance information acquisition process either when the program boots up or each time a fixed period of time has elapsed since the previous apparatus performance information acquisition process. When the relevant execution indication is issued repeatedly, this indication need not be issued exactly at each fixed period as long as it is being repeated.

The apparatus performance information acquisition module 32300 repeats the following series of processes for the management-target apparatus.

The apparatus performance information acquisition module 32300 first instructs the management-target apparatus to send information (referred to as “apparatus performance information” hereinafter) denoting the performance value (performance value corresponding to the metrics 33130 of the apparatus performance management table 33100) of the management-target device (Step 61010). Each management-target apparatus, which receives this indication, sends the management server 30000 apparatus performance information of its own management-target device in response.

The apparatus performance information acquisition module 32300 determines whether or not there has been a response from the management-target apparatus, that is, whether or not apparatus performance information has been received (Step 61020), and in a case where there is a response from the management-target apparatus (Step 61020: Yes), updates the value (performance value) in the field 33150 of the apparatus performance management table 33100 based on the received apparatus performance information (Step 61030) and advances the processing to Step 61040. Alternatively, in a case where there has not been a response from the management-target apparatus (Step 61020: No), the apparatus performance information acquisition module 32300 ends the apparatus performance information acquisition process.

Advancing to Step 61040, the apparatus performance acquisition module 32300 references field 33150 of the apparatus performance management table 33100 and repeats the processing from Step 61050 through Step 61070 with respect to the performance value of each management-target device. That is, the apparatus performance acquisition module 32300 checks whether the performance value exceeds the alert execute threshold and updates the value (status) of field 33180 of the apparatus performance management table 33100 (Step 61050). Then, the apparatus performance acquisition module 32300 determines whether or not the status has changed from normal to threshold abnormality, or from threshold abnormality to normal (Step 61060), in a case where the status has changed (Step 61060: Yes), registers an event in the event management table 33700 (Step 61070). In a case where the status has not changed (Step 61060: No), the apparatus performance acquisition module 32300 moves the processing to Step 61040 in a case where the status check process with respect to all performance values of the management-target devices has not ended.

After the above processing (from Step 61040 through Step 61070) has ended for all performance values of the management-target devices, the apparatus performance acquisition module 32300 determines whether or not a newly registered additional event exists (Step 61080), and in a case where an additional event exists (for example, a case in which a new abnormality has occurred during processing) (Step 61080: Yes), instructs the event analysis processing module 32500 to perform a failure cause analysis process (refer to FIG. 12) (Step 61090). Alternatively, in a case where an additional event does not exist (Step 61080: No), the apparatus performance acquisition module 32300 ends the apparatus performance information acquisition process. The above is an apparatus performance information acquisition process, which is implemented by the apparatus performance acquisition module 32300.

<Details of Failure Cause Analysis Process (Step 61090)>

Figure 12:
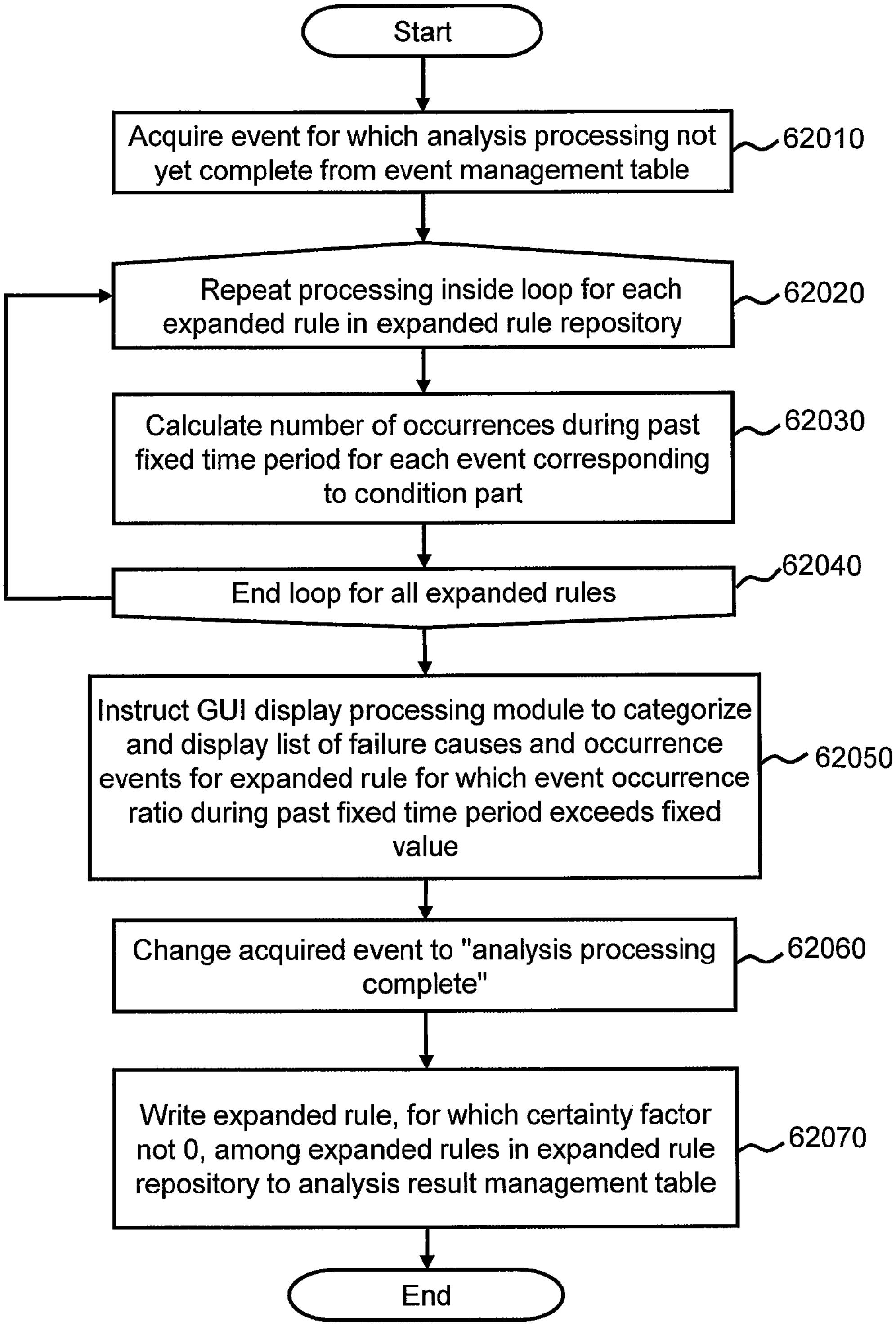
FIG. 12 is a flowchart of a failure cause analysis process related to the first embodiment.

FIG. 12 is a flowchart of a failure cause analysis process related to the first embodiment.

The event analysis processing module 32500 of the management server 30000 acquires from the event management table 33300 an event for which analysis processing has not been completed, that is, an event for which the analyzed flag is "No" (Step 62010).

Next, the event analysis processing module 32500 repeats the processing from Step 62020 through Step 62040 for each expanded rule in the expanded rule repository 33500. That is, the event analysis processing module 32500 tabulates the number of condition events, which have occurred within a fixed period in the past (number of occurrences of a condition event) from among the condition events described in the expanded rule (Step 62030).

Then, after the processing with respect to all the expanded rules inside the expanded rule repository 33500 has ended, the event analysis processing module 32500 determines whether or not the incidence of the condition event, that is, a ratio of the number of occurrences of condition events tabulated in Step 62030 to the number of all condition events in the expanded rule exceeds a fixed ratio, and in a case where the incidence of the condition event exceeds the fixed ratio, instructs the GUI display processing module 32400 to display the contents of the event, which constitutes the cause of the failure, that is, the conclusion event of the expanded rule together with the incidence of the condition event (Step 62050). Thereafter, the event analysis processing module 32500 configures the value (analyzed flag) of the event management table 33300 field 33370 related to the event acquired in Step 62010 to data indicating that analysis processing complete, that is, "Yes" (Step 62060).

Thereafter, the event analysis processing module 32500 writes the analysis result related to the expanded rule, in which the certainty factor (that is, the incidence of the condition event) is not 0, among the respective expanded rules inside the expanded rule repository 33500 to the analysis result management table 33600 (Step 62070).

A specific example will be given here to explain the failure cause analysis process. For example, in the expanded rule "ExRule 1-1" shown in FIG. 9A, "response time threshold abnormality of the logical volume '/var' on the host computer 'HOST 1'" and "I/Os per unit of time threshold abnormality of the volume 'LU 1' in the storage apparatus 'SYS 1'" are defined in the condition part.

Then, when "I/Os per unit of time threshold abnormality of the volume 'LU 1' in the storage apparatus 'SYS 1'" (occurrence date/time: 2010-01-01 15:05:00) is registered in the event management table 33300 shown in FIG. 7, after waiting for a fixed period of time, the event analysis processing module 32500 references the event management table 33300 and acquires the event, which occurred during the fixed time period in the past (Step 62010).

Next, the event analysis processing module 32500 calculates the number of occurrences during a past fixed time period of the condition events described in the expanded rule "ExRule 1-1" of the expanded rule repository 33500 (Step 62030). Since the result thereof is that "response time threshold abnormality of the logical volume '/var' on the host computer 'HOST 1'" has also occurred during the past fixed time period, the number of occurrences during the past fixed time period of the condition events described in the expanded rule "ExRule 1-1" becomes to 2, and the incidence of the condition event is 2/2.

In a case where the incidence of the condition event calculated as describe hereinabove exceeds a fixed value, the event analysis processing module 32500 instructs the GUI display processing module 32400 to display the event constituting the failure cause together with the incidence of the condition event (Step 62050). In a case where the fixed value referred to here, for example, is 30%, the incidence of the condition event of the expanded rule "ExRule 1-1" is 2/2, that is, 100%, and as such, the analysis result is displayed via the GUI.

The event analysis processing module 32500 executes the above-described processing for all the expanded rules defined in the expanded rule repository 33500.

The above is a failure cause analysis process, which is implemented by the event analysis processing module 32500.

Normally, in order to implement the failure cause analysis process, a rule corresponding to an occurrence pattern of a failure event for which cause analysis is to be implemented must be registered beforehand in the general rule repository 33400 as the general rule. For example, in order to analyze the failure cause when the above-mentioned failure event group ("response time threshold abnormality of the logical volume on the host computer 10000" and "I/Os per unit of time threshold abnormality of the volume 24100 in the storage apparatus 20000") has occurred, the general rule "Rule 1" as shown in FIG. 8 must exist beforehand in the general rule repository 33400. Thus, the user must create a rule for a failure pattern that is likely to occur in the management-target computer system when the failure analysis system is installed. Normally, since it is possible to infer a likely-to-occur failure event pattern and a failure cause by referring to past event occurrence situations, the user creates a rule based on a past event occurrence situation. Specifically, the operations administrator, who is the user of the failure analysis system, references the event management table 33300 beforehand, selects an occurrence pattern that can be made into a rule, creates a rule, and registers the rule in the general rule repository 33400. However, since each apparatus included in the computer system issues various types of event messages, the larger the size of the management-target computer system, the greater the number of event message-source apparatuses, making the creation of rules a major task for the operations administrator. In addition, although the task of creating a rule should be performed numerous times when the failure analysis system is installed, it is easy to imagine that the operations administrator will not be highly skilled at this task at installation time, making the likelihood of human error extremely high.

Consequently, in the first embodiment, the management server 30000 selects an event occurrence pattern that appears capable of being made into a rule using an event occurrence log recorded in the event management table 33300 and a log of analysis results recorded in the analysis results management table 33600, and creates a new rule (new rule) by adding an event to the rule used in analysis, and presents the created rule to the user, and queries whether or not to use the created rule in a subsequent analysis.

<Contents of Rule Creation Process>

In order to solve the problems in the prior art, in the first embodiment, a rule creation process on the management server 30000 is added and a rule creation module 327000 for implementing this process is added. The relevant rule creation process will be explained in detail below.

<Details of Rule Creation Process Related to First Embodiment>

Figure 13:
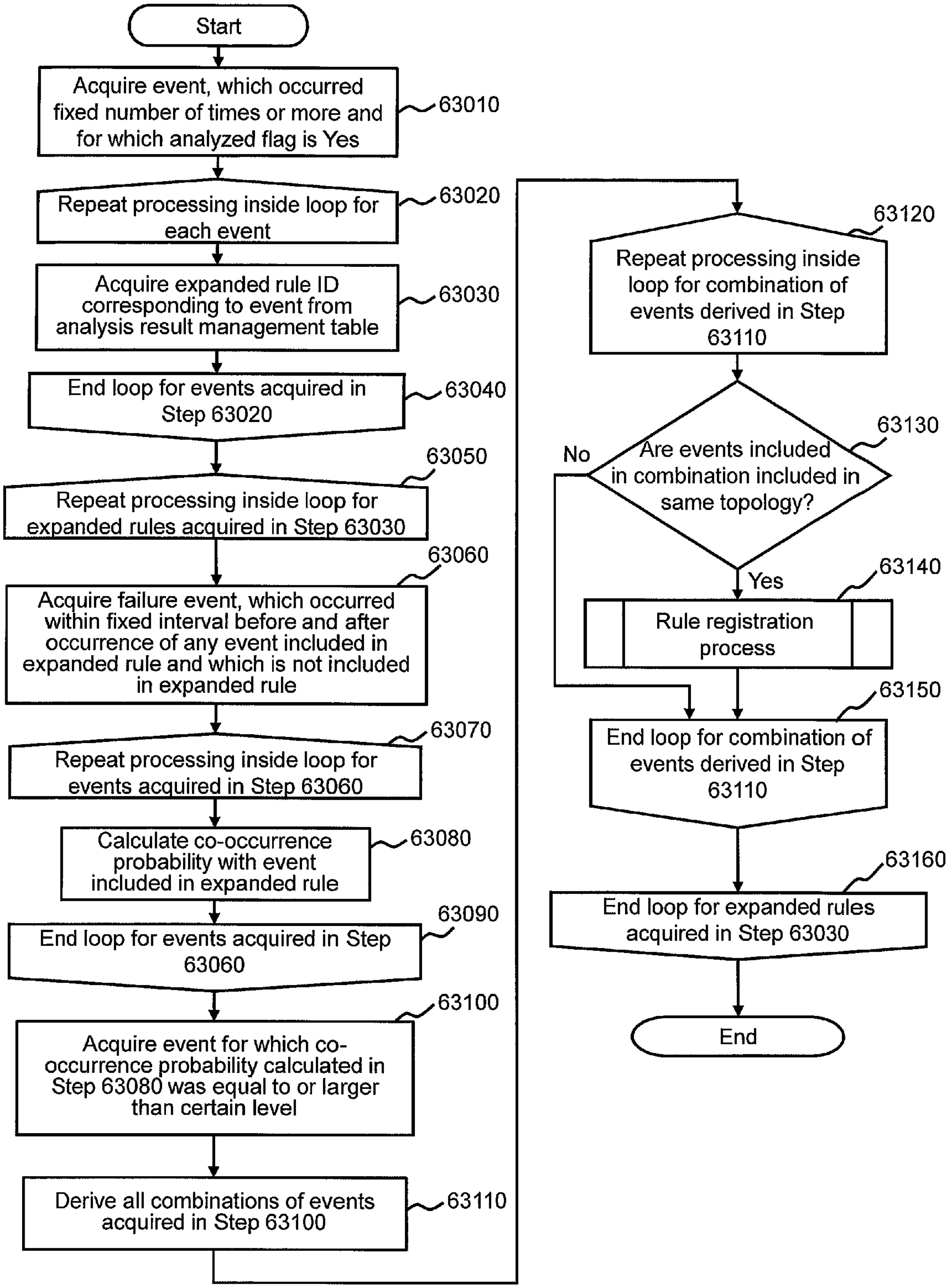
FIG. 13 is a flowchart of a rule creation process related to the first embodiment.

FIG. 13 is a flowchart of a rule creation process related to the first embodiment.

The program control module 32100 of the management server 30000 instructs the rule creation module 32700 to execute the rule creation process either when the management server 30000 is set up, or each time a fixed period of time has elapsed since the previous rule creation process. When the relevant execution indication is issued repeatedly, this indication need not be issued exactly at each fixed period as long as it is being repeated.

The rule creation module 32700 uses the event management table 33300 to inspect a past event occurrence log. Then, the rule creation module 32700 acquires an event, which has occurred a fixed number of times or more and for which the analyzed flag (the value of field 33370) is "Yes" (Step 63010).

The rule creation module 32700 repeats the processing from Step 63020 through Step 63040 for each event. The rule creation module 32700 uses the analysis results management table 33600 to acquire a corresponding expanded rule ID with respect to the event acquired in Step 63010 (Step 63030).

Then, after the corresponding expanded rule ID has been acquired for all the events, the rule creation module 32700 repeatedly implements the processing from Step 63050 through Step 63160 for each expanded rule denoted by the acquired expanded rule ID. One expanded rule, which constitutes the processing target from among the expanded rules denoted by the expanded rule ID acquired in Step 63030, will be referred to here as "target expanded rule" in the explanation of FIG. 13.

First, from among events, which have occurred (that is, co-occurred with a condition event) within a fixed period before or after the occurrence of any condition event included in the target expanded rule, the rule creation module 32700 acquires from the event management table 33300 an event (hereinafter referred to as "co-occurrence event candidate"), which is not included in the target expanded rule (Step 63060).

Next, the rule creation module 32700 repeatedly executes the processing from Step 63070 through Step 63090 for each co-occurrence event candidate acquired in Step 63060. The rule creation module 32700, based on the number of occurrences and the number of co-occurrences of the co-occurrence event candidate and the target expanded rule condition event, calculates a probability (referred to as "co-occurrence probability" hereinafter) for the co-occurrence event candidate to co-occur with the condition event included in the target expanded rule (Step 63080). In so doing, for example, in a case where the co-occurrence event candidate co-occurs with at least one of the condition events included in the target expanded rule, the rule creation module 32700 implements the calculation of the co-occurrence probability by assuming the events are co-occurring.

Then, after implementing the processing of Step 63080 for all the co-occurrence event candidates acquired in Step 63060, the rule creation module 32700 acquires an event from among the co-occurrence event candidates for which the co-occurrence probability is equal to or larger than a fixed value (Step 63100). The event from among the co-occurrence event candidates for which the co-occurrence probability is equal to or larger than a fixed value here is an event, which is presumed to have occurred as a result of the same cause as the condition event of the target expanded rule, and will be referred to as "co-occurrence event" hereinafter.

Next, the rule creation module 32700 derives, with respect to the acquired one or more co-occurrence events, all the event combinations in which at least one or more co-occurrence events are included (Step 63110). The combination of events derived in Step 63110 is a group of events (referred to as "co-occurrence event group" hereinafter: second event group), which co-occurred with respect to the target expanded rule. For example, in a case where two co-occurrence events A and B have been obtained, three co-occurrence event groups are derived: a co-occurrence event group including only co-occurrence event A, a co-occurrence event group including only co-occurrence event B, and a co-occurrence event group including co-occurrence event A and co-occurrence event B. The rule creation module 32700 repeatedly executes the processing from Step 63120 through Step 63150 for each derived co-occurrence event group. Of the derived co-occurrence event groups, the one that constitutes the processing target will be referred to as "target co-occurrence event group" in the explanation of FIG. 13 here.

Next, the rule creation module 32700 uses the volume topology management table 33200 to check whether or not the target co-occurrence event group and the condition event group included in the target expanded rule occurred in apparatuses included in the same topology, that is, apparatuses comprising a mutual connecting relationship (Step 63130).

In a case where the result is that the target co-occurrence event group and the condition event group included in the target expanded rule occurred in apparatuses included in the same topology (Step 63130: Yes), the rule creation module 32700 implements the rule registration process and registers the rule with respect to the target co-occurrence event group and the target expanded rule (Step 63140). Alternatively, in a case where the target co-occurrence event group and the condition event group included in the target expanded rule did not occur in apparatuses included in the same topology (Step 63130: No), the rule creation module 32700 advances the processing to Step 63150 without doing anything.

Then, after the processing (from Step 63120 through Step 63150) for each of the co-occurrence event groups derived in Step 63100 has ended, the rule creation module 32700 advances the processing to Step 63160. Ina case where processing (from Step 63050 through Step 63160) has not been performed for all the expanded rules denoted by the expanded rule ID acquired in Step 63030 in accordance with this, the rule creation module 32700 moves the processing to Step S63050.

Alternatively, after the processing (from Step 63050 through Step 63160) has ended for all the expanded rules denoted by the expanded rule ID acquired in Step 63030, the rule creation module 32700 ends the rule creation process.

<Details of Rule Registration Process>

Figure 14:
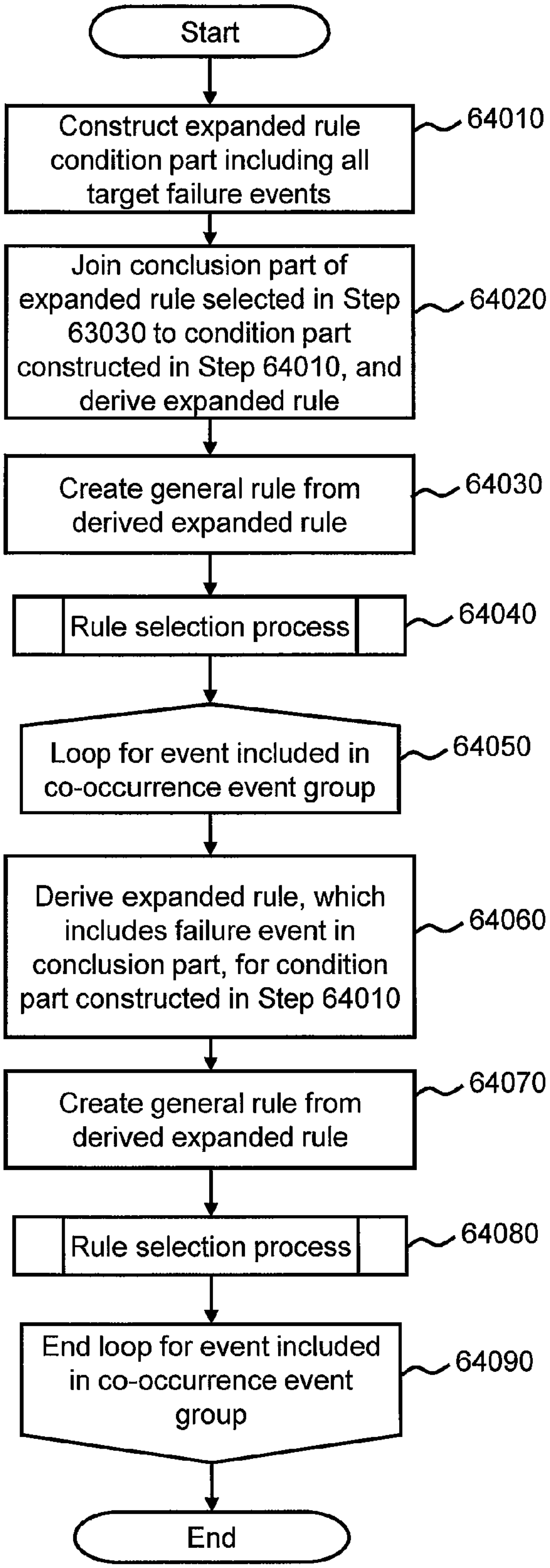
FIG. 14 is a flowchart of a rule registration process related to the first embodiment.

FIG. 14 is a flowchart of a rule registration process related to the first embodiment.

The rule registration process corresponds to Step 63140 of FIG. 13. In the explanation of FIG. 14 below, the co-occurrence event group, which is the target of the rule registration process, will be called "target co-occurrence event group", and the expanded rule, which is the target of the rule registration process, will be called "target expanded rule".

First, the rule creation module 32700 constructs a condition part, which includes all the events of the target co-occurrence event group and the condition event group included in the target expanded rule, and treats each event of all the events (first event group) as a condition event (Step 64010).

Next, the rule creation module 32700 joins the conclusion part of the target expanded rule to the condition part constructed in Step 64010, and derives a new expanded rule (Step 64020).

Then, the rule creation module 32700, based on the new expanded rule derived in Step 64020, creates a general rule (first new rule) by abstracting the management-target apparatus and the management-target device, which are the origins of the condition event and the conclusion event, using the apparatus type and the apparatus component type (Step 64030). The new general rule created from the new expanded rule may be called "new rule" (new rule) hereinbelow.

The rule creation module 32700 performs a rule selection process in which the rule creation module 32700 checks for the presence or absence of an existing registration in the general rule repository 33400 with respect to the new rule created in Step 64030, after that presents the new rule to the user and registers the new rule in the general rule repository 33400 in accordance a user selection (Step 64040).

Next, the rule creation module 32700 repeatedly executes the processing of Step 64050 through Step 64090 for each event (co-occurrence event) included in the target co-occurrence event group. One processing target from among the co-occurrence events included in the target co-occurrence event group will be referred to as "target co-occurrence event" in the explanation of FIG. 14.

First, the rule creation module 32700 derives with respect to the condition part constructed in Step 64010 a new expanded rule, which includes the target co-occurrence event in the conclusion part (Step 64060).

Then, the rule creation module 32700, based on the new expanded rule derived in Step 64060, creates a general rule (second new rule) by abstracting the management-target apparatus and the management-target device, which are the origins of the condition event and the conclusion event, using the apparatus type and the apparatus component type (Step 64070).

The rule creation module 32700 performs a rule selection process in which the rule creation module 32700 checks for the presence or absence of an existing registration in the general rule repository 33400 with respect to the new rule created in Step 64070, after that presents the new rule to the user, and registers the new rule in the general rule repository 33400 in accordance a user selection (Step 64080), and in a case where the processing (from Step 64050 through Step 64090) has not been executed for all the events of the target co-occurrence event group, moves the processing to Step 64050.

Alternatively, in a case where the processing (from Step 64050 through Step 64090) has ended for all the co-occurrence events included in the target co-occurrence event group, the rule creation module 32700 ends the rule registration process.

Figure 15:
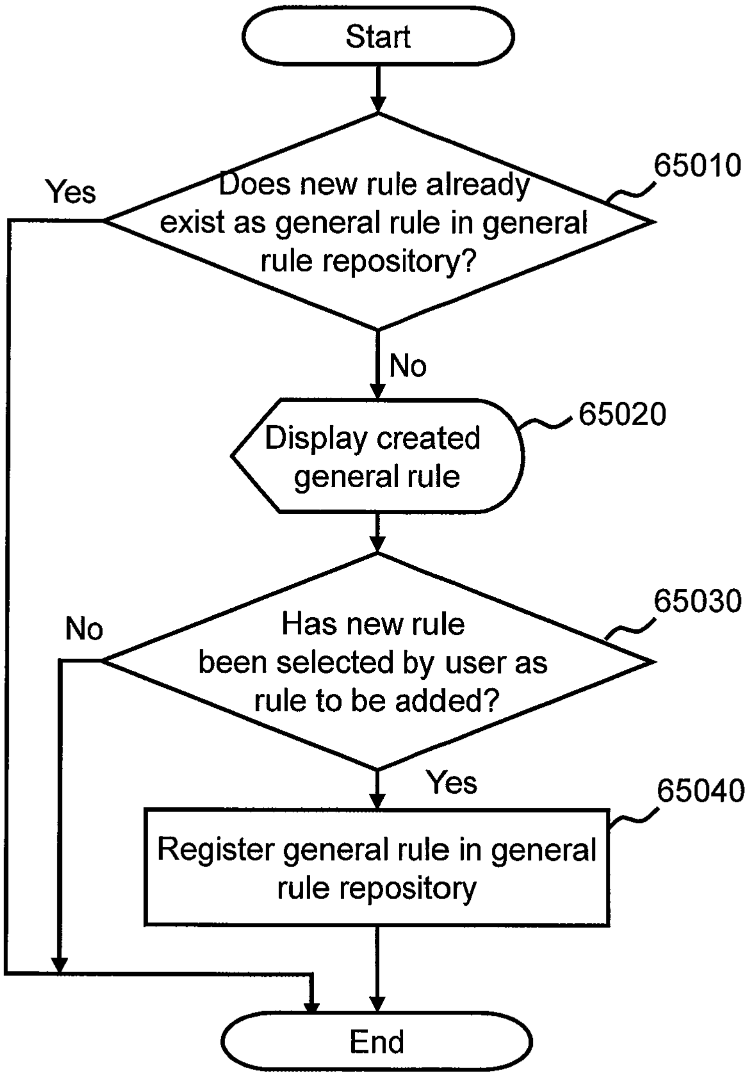
FIG. 15 is a flowchart of a rule selection process related to the first embodiment.

FIG. 15 is a flowchart of a rule selection process related to the first embodiment.

The rule selection process corresponds to Step 64040 and Step 64080 of FIG. 14. The rule selection process checks for the presence or absence of an existing registration with respect to a new rule, and allows the user to select whether or not the new rule is to be used in cause analysis.

First, the rule creation module 32700 checks whether or not the new rule already exists in the general rule repository 33400 (Step 65010).

In a case where the new rule has yet to be registered, the rule creation module 32700 displays the new rule on either the output device 31200 or the WEB browser boot-up server 35000. The rule creation system in this embodiment, after acquiring from the event occurrence log an event potentially capable of being made into a rule based on the co-occurrence probability between events, creates a new rule based on a combination of the acquired events, and the operations administrator must actually make a determination as to whether or not the event defined in the conclusion part is really correct as a conclusion. Consequently, the rule creation module 32700 displays the contents of the new rule and the occurrence log information of the actually occurred event group, which prompted the determination thereof (became the grounds for creating the new rule), on either the output device 31200 or the WEB browser boot-up server 35000 (Step 65020). The rule creation module 32700, for example, displays a created rule display screen (refer to FIG. 16), which will be explained further below, on either the output device 31200 or the WEB browser boot-up server 35000.

In a case where the new rule has been selected by the user as a rule to be added, that is, a case in which an input denoting that the new rule is to be used in subsequent cause analysis has been accepted (Step 65030: Yes), the rule creation module 32700 registers the new rule in the general rule repository 33400 (Step 65040).

Alternatively, in a case where the new rule has not been selected by the user as a rule to be added, that is, a case in which an input denoting that the new rule is not to be used in subsequent cause analysis has been accepted (Step 65030: No), the rule creation module 32700 ends the rule selection process without registering the new rule in the general rule repository 33400.

The rule creation module 32700, for example, may store a user selection log (including information denoting that the new rule is not to be used in root cause analysis), which includes the contents of the new rule and the content of a user selection with respect to this new rule (content denoting whether or not the new rule was selected as a rule to be added) for the created new rule, for example, in the memory 32000. The rule creation module 32700, for example, in a case where the rule selection process is to be performed thereafter, may also reference the user selection log, determine whether or not the created new rule (fourth new rule) is the rule (third new rule), which the user refused to register previously, and not perform the display processing of Step 65020 for a rule, which the user refused to register previously. In so doing, a rule, which was refused registration previously, can appropriately be prevented from being displayed to the user again, making it possible to avoid registering the relevant rule in the general rule repository 33400.

The preceding is the rule creation process according to the first embodiment.

<Configuration of Created Rule Display Screen>

FIG. 16 is a diagram showing an example of the configuration of a created rule display screen related to the first embodiment.

The created rule display screen 71000 displays the contents of a created new rule and occurrence log information of an actually occurred event group, which prompted the determination to create this new rule (became the grounds for new rule creation).

The contents of a created general rule (new rule) and event occurrence log information used for analyzing a co-occurrence relationship are displayed in a created rule display table 71010 in the created rule display screen 71000. In this drawing, a co-occurrence relationship between a condition event included in the general rule "Rule 1" and "threshold abnormality of processor utilization in controller 25000 of storage apparatus 20000" are selected in accordance with analysis of the event management table 33300 with respect to the general rule "Rule 1" of FIG. 8, which originally existed in the general rule repository 33400, and a new rule created on the basis of this co-occurrence relationship is displayed. The created new rule is a rule by which "processor utilization bottleneck (threshold abnormality) in controller 25000 of storage apparatus 20000" becomes the cause when "response time threshold abnormality of logical volume on host computer 10000", "processor utilization threshold abnormality in controller 25000 of storage apparatus 20000", and "I/Os per unit of time threshold abnormality of volume 24100 in storage apparatus 20000" have been detected. "Processor utilization threshold abnormality in controller 25000 of storage apparatus 20000" is added to the general rule "Rule 1", and is displayed in a format that makes this fact clear. That is, in this example, "(New)" is displayed in the added event. Then, the created rule display screen 71000 comprises interfaces (in this embodiment, button 71020 and button 71030) for inputting whether or not this new rule is to be added after the user has made a determination as to whether or not this new rule may be added to the general rule repository 33400.

In this embodiment, the rule selection process is invoked each time a new rule is created as shown in FIG. 14, and only one created new rule is displayed in the created rule display screen 71000 shown in FIG. 16 as a result thereof. However, in the rule registration process of FIG. 14, the rule selection process is not always invoked each time a new rule is created, but rather the created new rule may be stored in memory, and a created new rule group may be collectively displayed to the user after a series of rule creation processes have ended. In accordance with this, multiple created rule display tables 71010 may be displayed for each new rule in the created rule display screen 71000 shown in FIG. 16, and a checkbox may be disposed in each of the display tables 71010 so as to enable a selection to be made as to whether or not a new rule needs to be added to the general rule repository 33400.

<Effects of Rule Creation Process>

According to the first embodiment described hereinabove, the management software of the management server 30000 implements the rule creation process shown in FIG. 13 through FIG. 15 either when the management software is booted up, or each time a fixed time period has elapsed. In the rule creation process according to the first embodiment, for a rule (existing rule), which exists in the general rule repository 33400 and has been used previously in failure cause analysis processing, a new rule, which has added an event (co-occurrence event) having a co-occurrence probability of equal to or larger than a fixed value making it possible to presume that an event will occur as a result of the same cause as that of the condition event of this rule, is constructed and presented to the user after having acquired a co-occurrence event based on an event occurrence situation recorded in the event management table 33300. Thus, a failure occurrence log and a failure cause analysis log with respect to a failure, which has occurred, are used, but, for example, a rule may be created by artificially causing the occurrence of a failure and using the result obtained by implementing cause analysis processing with respect thereto. In the past, it was necessary to create a rule based on a result obtained by either the user selecting a failure cause analysis pattern based on an event occurrence situation recorded in the event management table 33300, or a hearing implemented by the operations administrator as to the manner in which failures have occurred at the actual operational management site. By contrast, according to this embodiment, the automation of rule creation makes it possible to create appropriate rules, and, in addition, also makes it possible to reduce the number of tasks and to lessen human operational errors.

A new rule created in accordance with the first embodiment (the rule displayed in the created rule display table 71010 of FIG. 16) includes the event "processor utilization threshold abnormality in controller 25000 of storage apparatus 20000", which the user was not aware of in the past. That is, the user was not readily able to discover that the cause of a failure event included in the general rule "Rule 1" was this event, but this event is automatically analyzed and displayed without adding a user procedure. In this example, the fact that a failure occurs in the drive of the host computer 10000 as a result of a failure having occurred in the volume 24100 has been made into a rule, but the user did not realize that the cause thereof lies in the controller 25000 of the storage 20000. Therefore, there was a high likelihood that the user would deal with the failure by recreating the volume 24100 and would not be able to resolve the abnormality in the controller 25000, which as the root cause. In a case like this, the present invention is able to present the user with an abnormality in the controller 25000, which is the root cause, rather than the so-called "apparent cause" of up to now.

In addition, the rule creation process related to the first embodiment is for failure cause analysis, but this rule creation process may be used for processing other than a failure cause analysis. For example, the use of this rule creation process to group together failures, which have occurred, makes it possible for the user to infer to a certain degree after troubleshooting whether or not action has already been taken for a previously occurred failure without rechecking the failure occurrence situations one by one.

Thus, according to this embodiment, it is possible to reduce the load on the system operations administrator required for rule creation and troubleshooting.

[Embodiment 2]

In the first embodiment, for an existing rule, which exists in the general rule repository 33400 and has been used previously in failure cause analysis processing, a new rule, which has added an event (co-occurrence event) having a co-occurrence probability of equal to or larger than a fixed value making it possible to presume that an event will occur as a result of the same cause as that of the condition event of this rule, is constructed and presented to the user after having acquired a co-occurrence event based on an event occurrence situation recorded in an event management table. Thus, in the first embodiment, a new rule is created by adding a co-occurrence event based on an existing general rule. The rule creation process related to the second embodiment constructs a new rule solely from a pattern of an event occurrence situation recorded in an event management table without using this existing rule. Explanations will be omitted for those aspects of the system configuration and the configurations of the respective apparatuses, which are substantially the same as those of the first embodiment.

<Contents of Rule Creation Process>

The operation of a rule creation process in a rule creation module 327000, which has been added to the management server 30000 related to the second embodiment, will be explained in detail.

<Details of Rule Creation Process Related to Second Embodiment>

Figure 17:
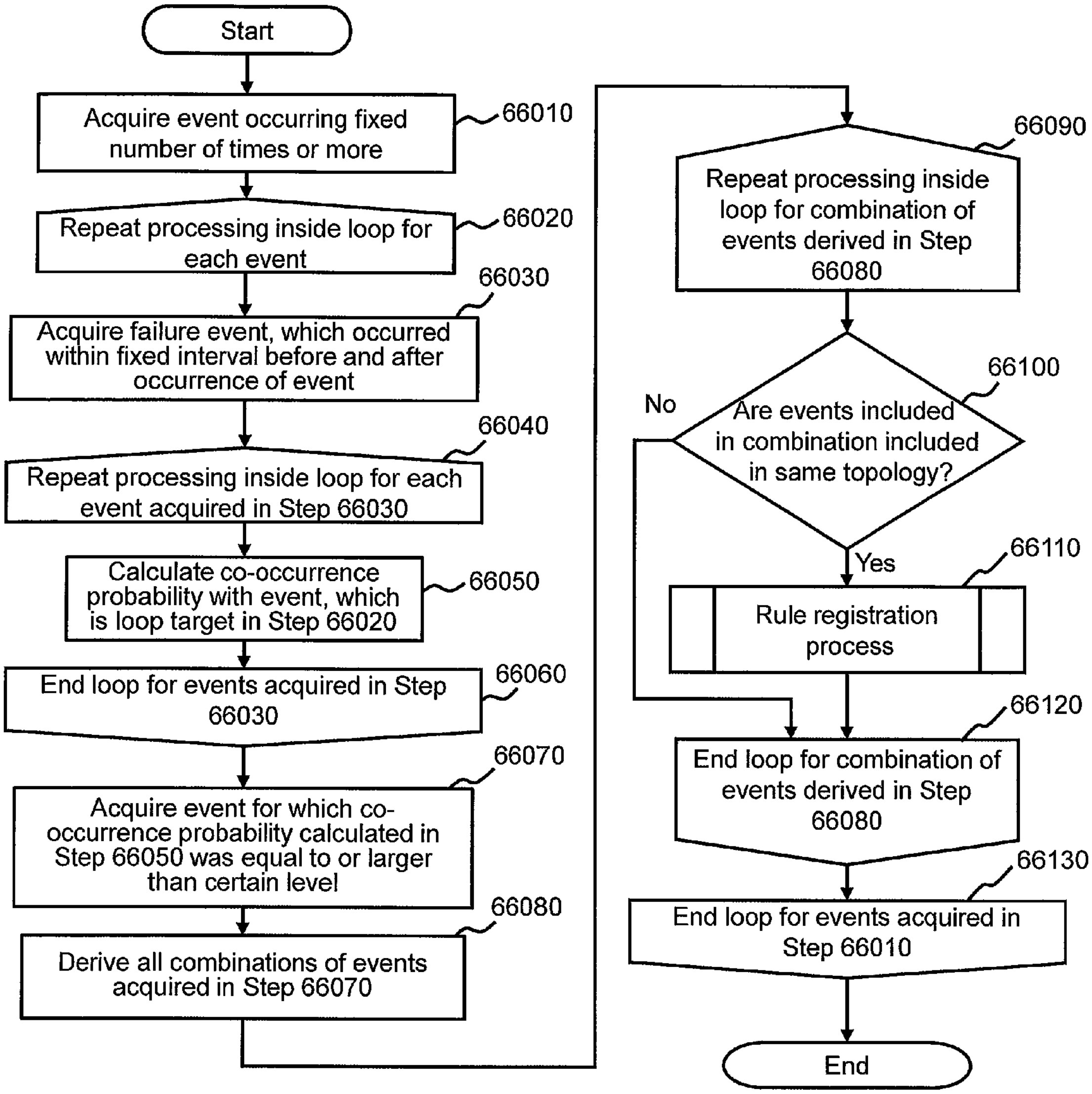
FIG. 17 is a flowchart of a rule creation process related to a second embodiment.

FIG. 17 is a flowchart of the rule creation process related to the second embodiment.

The program control module 32100 of the management server 30000 instructs the rule creation module 32700 to execute rule creation processing either at setup of the management server 30000, or each time a fixed time period has elapsed since the previous rule creation process. When the relevant execution indication is issued repeatedly, this indication need not be issued exactly at each fixed period as long as it is being repeated.

The rule creation module 32700 uses the event management table 33300 to inspect a past event occurrence log. Then, the rule creation module 32700 acquires an event, which has occurred a fixed number of times or more (Step 66010).

The rule creation module 32700 repeatedly executes the processing from Step 66020 through Step 66130 for each event acquired in Step 66010. One processing target from among the events acquired in Step 66010 will be referred to as "target event" in the explanation of FIG. 17.

First, the rule creation module 32700 uses the event management table 33300 to select an event (hereinafter referred to as "co-occurrence event candidate" in the second embodiment), which occurred (that is co-occurred with the target event) within a fixed interval before or after the occurrence of the target event (Step 66030).

Next, the rule creation module 32700 repeatedly executes the processing from Step 66040 through Step 66060 for each co-occurrence event candidate acquired in Step 66030. The rule creation module 32700, based on the number of occurrences and the number of co-occurrences of the relevant co-occurrence event candidate and the target event, calculates the co-occurrence probability with respect to the target event (Step 66050).

Then, after the processing (from Step 66040 through Step 66060) for all the co-occurrence event candidates has ended, the rule creation module 32700 acquires from among the co-occurrence event candidates an event (hereinafter referred to as "co-occurrence event" in the second embodiment) for which the co-occurrence probability is equal to or larger than a fixed value (Step 66070).

The rule creation module 32700 derives all the event combinations of the one or more co-occurrence events acquired in Step 66070 (Step 66080). Each of the combinations derived in Step 66080 is a co-occurrence event group in the second embodiment. The rule creation module 32700 implements the processing from Step 66090 through Step 66120 for each derived co-occurrence event group. The one derived co-occurrence event group treated as the processing target will be referred to as "target co-occurrence event group" in the explanation of FIG. 17 here.

The rule creation module 32700 uses the volume topology management table 33200 to check whether or not events, which are included in the target co-occurrence event group, occurred in apparatuses included in the same topology, that is, apparatuses comprising a mutual connecting relationship (Step 66100).

In a case where the result is that the events occurred in apparatuses included in the same topology (Step 66100: Yes), the rule creation module 32700 implements the rule registration process and registers the rule with respect to the target co-occurrence event group (Step 66110). Alternatively, in a case where the events do not occur in apparatuses included in the same topology (Step 66100: No), the rule creation module 32700 advances the processing to Step 66120 without doing anything. In a case where the processing (from Step 66020 through Step 66130) has not been performed for all the events acquired in Step 66010, the rule creation module 32700 moves the processing to Step 66020.

Alternatively, after the processing (from Step 66020 through Step 66120) has ended for all the events acquired in Step 66010, the rule creation module 32700 ends the rule creation process.

<Details of Rule Registration Process>

Figure 18:
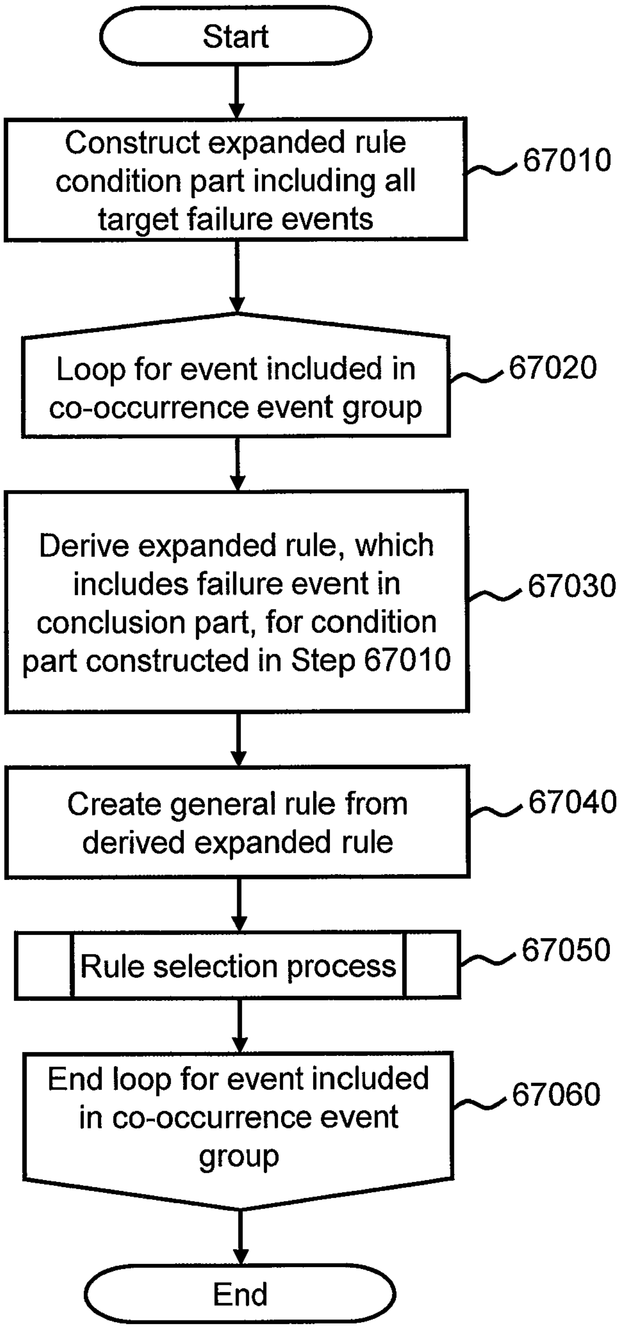
FIG. 18 is a flowchart of a rule registration process related to the second embodiment.

FIG. 18 is a flowchart of the rule registration process related to the second embodiment.

The rule registration process corresponds to Step 66110 of the rule creation process (FIG. 17). In the explanation of FIG. 18, the co-occurrence event group, which is the target of the rule registration process, will be referred to as "target co-occurrence event group".

First, the rule creation module 32700 constructs a condition part, which treats each event of the target co-occurrence event group (first event group) as a condition event (Step 67010).

Next, the rule creation module 32700 repeatedly executes the processing from Step 67020 through Step 67060 for each event (co-occurrence event) included in the target co-occurrence event group. One processing target from among the co-occurrence events included in the target co-occurrence event group will be referred to as "target co-occurrence event" in the explanation of FIG. 18.

First, the rule creation module 32700 derives a new expanded rule, which includes the target co-occurrence event in the conclusion part, with respect to the condition part constructed in Step 67010 (Step 67030).

Then, the rule creation module 32700, based on the derived new expanded rule, creates a general rule (new rule) by abstracting the management-target apparatus and the management-target device, which are the origins of the condition event and the conclusion event, using the apparatus type and the apparatus component type (Step 67040).

The rule creation module 32700 performs a rule selection process in which the rule creation module 32700 checks for the presence or absence of an existing registration in the general rule repository 33400 with respect to the created new rule (that is, the new rule), after that presents the new rule to the user, and registers the new rule in the general rule repository 33400 in accordance with being selected by the user (Step 67050). The rule selection process of Step 67050 is substantially the same as the rule selection process described using FIG. 15 in the first embodiment. In the second embodiment, the created rule display screen shown in FIG. 19 is displayed in Step 65020 of the rule selection process of FIG. 15.

The preceding is the rule creation process according to the second embodiment.

<Configuration of Created Rule Display Screen>

FIG. 19 is a diagram showing an example of the configuration of the created rule display screen related to the second embodiment.

The created rule display screen 72000 related to the second embodiment displays the contents of a created new rule and occurrence log information of an actually occurred event group, which prompted the determination to create this new rule the same as the created rule display screen 71000 related to the first embodiment.

The contents of a created general rule (new rule) and event occurrence log information used for analyzing a co-occurrence relationship are displayed in a created rule display table 72010 in the created rule display screen 72000. In this drawing, a co-occurrence relationship between "response time threshold abnormality of logical volume on host computer 10000", "processor utilization threshold abnormality in controller 25000 of storage apparatus 20000", and "I/Os per unit of time threshold abnormality of volume 24100 in storage apparatus 20000" is selected in accordance with analysis of the event management table 33300, and a rule created on the basis of this co-occurrence relationship is displayed. The created new rule is a rule by which "processor utilization bottleneck (threshold abnormality) in controller 25000 of storage apparatus 20000" becomes the cause when "response time threshold abnormality of logical volume on host computer 10000", "processor utilization threshold abnormality in controller 25000 of storage apparatus 20000", and "I/Os per unit of time threshold abnormality of volume 24100 in storage apparatus 20000" have been detected. In the second embodiment, rule creation is performed without using the existing general rule. The fact that "processor utilization threshold abnormality in controller 25000 of storage apparatus 20000" in FIG. 16 is added to the existing rule is displayed in an easy-to-understand format. In the second embodiment, although it is not necessary to display the difference between an existing rule event and an added event, in FIG. 19, information (that is, a display referring to "(New)") denoting that the event was not derived using the existing rule, is displayed for all events in keeping with the display in the first embodiment. In addition, the created rule display screen 72000 comprises interfaces (in this embodiment, button 72020 and button 72030) for inputting whether or not this new rule is to be added after the user has made a determination as to whether or not this new rule may be added to the general rule repository 33400 the same as in FIG. 16.

In this embodiment, the same as in FIG. 14, the rule selection process is invoked each time a new rule is created as shown in FIG. 18, and only one created new rule is displayed in the created rule display screen 72000 shown in FIG. 19 as a result thereof. However, in the rule registration process of FIG. 18, the rule selection process is not always invoked each time a new rule is created, but rather the created new rule may be stored in memory, and a created new rule group may be collectively displayed to the user after a series of rule creation processes has ended. In accordance with this, multiple created rule display tables 72010 may be displayed for each new rule in the created rule display screen 72000 shown in FIG. 19, and a checkbox may be disposed in each of the display tables 72010 to enable a selection to be made as to whether or not a new rule needs to be added to the general rule repository 33400.

<Effects of Rule Creation Process>

According to the second embodiment described hereinabove, the management software of the management server 30000 implements the rule creation process shown in FIG. 17, FIG. 18 and FIG. 15 either when the management software is booted up, or each time a fixed time period has elapsed. In the rule creation process according to the second embodiment, the event management table 33300 is analyzed and a new rule, which has added another event that is co-occurring with an event, which has occurred, is constructed and presented to the user. Thus, a failure occurrence log is used, but, for example, a rule may be created by artificially causing the occurrence of a failure, storing the log of the failure occurrence, and using this failure occurrence log. In the past, it was necessary to create a rule based on a result obtained by either the user selecting a failure cause analysis pattern based on an event occurrence situation recorded in the event management table 33300, or a hearing implemented by the operations administrator as to the manner in which failures have occurred at the actual operational management site. By contrast, according to this embodiment, the automation of rule creation makes it possible to create appropriate rules, and, in addition, also makes it possible to reduce the number of tasks and to lessen human operational errors.

In addition, the rule creation process related to the second embodiment is for failure cause analysis, but this rule creation process may be used for processing other than a failure cause analysis. For example, the use of this rule creation process to group together failures, which have occurred, makes it possible for the user to infer to a certain degree after troubleshooting whether or not action has already been taken for a previously occurred failure without rechecking the failure occurrence situations one by one.

Thus, according to this embodiment, it is possible to create an appropriate rule, and to reduce the load of the system operations administrator required for rule creation and troubleshooting.

A number of embodiments have been explained hereinabove, but as described above, the management server 30000 related to the embodiments selects an event occurrence pattern capable of being made into a rule by storing events, which have occurred in the computer system, and analyzing the event occurrence patterns for each fixed time period. Then, the management server 30000 creates a new rule based on the selected occurrence pattern, and presents this new rule to the management server 30000 user.

In the failure analysis system disclosed in Patent Literature 1, a failure cause is inferred at failure cause analysis by applying a detected event to an IF-THEN rule, which denotes the corresponding relationship between a combination of condition events (condition event group), which could occur in the management-target apparatus, and a failure cause candidate (conclusion event). In so doing, the probability for each cause candidate is calculated.

In these embodiments, events, which have occurred in the computer system, are stored in the management server 30000 regardless of whether failure cause analysis is being implemented or not, and, in addition, in a case where failure cause analysis has been implemented, a log of the analysis results is stored. In addition, the user may also store an operations log showing what candidate of the cause candidates denoted by the management system was used in a failure cause analysis and what type of action was taken. Then, in a case where there is a relationship between a failure pattern, which has occurred during a certain specific time period, and the occurrence of the cause candidate denoted by the management system in accordance therewith, this failure pattern and failure occurrence are grouped together as an event and a cause candidate, which could be capable of being made into a rule. Then, a derivable IF-THEN rule is created for each group and presented to the management system user. In a case where an operations log is stored, the user's failure recovery operation subsequent to being presented with the cause candidate may also be included in the rule.

In addition, the management server 30000 in the embodiments displays the new rule created in accordance with the above-mentioned grouping process. In so doing, in a case where the new rule has been created based on an existing rule, which already exists, the new rule is displayed with a priority based on its distance from the existing rule. In addition, in a case where the operations log is used at the time of the grouping process, the new rule is displayed by including in the new rule the type of procedure used in the operation implemented with respect to the new rule.

A variety of methods are conceivable when it comes to how to group events together when creating a rule. In the embodiments, grouping is performed using an event co-occurrence relationship as an example.

The procedures by which the user makes a failure cause analysis pattern into a rule in a failure analysis based on an event occurrence situation arise mainly when the management system is installed, and as such, are tasks to which the user is not accustomed. According to the embodiments, the automation of these procedures makes it possible to reduce the number of tasks, and to lessen human operational errors.

In the first embodiment, the occurrence of an event in the computer system and the result of management software analyzing the failure cause are used to create an analysis rule for failure cause analysis, and this analysis rule is presented to the administrator. In the second embodiment, only the event occurrence situation in the computer system is used to create the analysis rule for failure cause analysis, and this analysis rule is presented to the administrator. The failure cause is analyzed automatically, and as such, when the management software is installed, the administrator must make an event, which could occur in the installation-target computer system, and the cause thereof into a rule beforehand. According to the second embodiment, the task of creating the rule can be automated, and the user simply selects whether or not a created rule may be used as the rule for failure cause analysis. This makes it possible to reduce the number of tasks, lessen human operational errors, and reduce the load required for troubleshooting.

The present invention can also be realized in accordance with a software program code for realizing the functions of the embodiments. In accordance with this, a storage medium on which the program code is recorded is provided to a system or an apparatus, and the computer (or CPU or MPU) of the system or apparatus reads the program code stored on the storage medium. In accordance with this, the program code itself, which has been read from the storage medium, realizes the functions of the embodiments explained hereinabove, and this program code itself and the storage medium storing this program code comprise the present invention. For example, a flexible disk, CD-ROM, DVD-ROM, hard disk, optical disk, magneto-optical disk, CD-R, magnetic tape, nonvolatile memory card, ROM or the like is used as the storage medium for supplying such a program code.

The configuration may also be such that the OS (operating system) running on the computer performs either all or part of the actual processing based on a program code indication, and the functions of the above-described embodiment are realized in accordance with this processing. In addition, the configuration may also be such that the program code, which has been read from the storage medium, is written to a memory on the computer, and thereafter the computer CPU performs either all or part of the actual processing based on a program code indication, and the functions of the above-described embodiment are realized in accordance with this processing.

The configuration may also be such that the program code of the software for realizing the functions of the embodiments is delivered via a network and stored on a hard disk, a memory or other such storage device, or on a CD-RW, CD-R, or other such storage medium, and at time of use, the computer (or CPU or MPU) of this system or apparatus reads and executes the program code stored on the relevant storage device or the relevant storage medium.

Embodiments have been explained hereinabove, but it goes without saying that the present invention is not limited to these embodiments, and that various changes are possible without departing from the gist thereof.

REFERENCE SIGNS LIST

10000 Host computer
20000 Storage apparatus
30000 Management server
35000 WEB browser boot-up server
40000 IP switch
45000 Communication network

The invention claimed is:

1. A method for supporting an analysis of a root cause of an event, which has occurred in any of multiple management-target apparatuses which are managed by a control device, based on one or more rules in a storage device, that denote an association between one or more condition events corresponding to one or more events capable of occurring in any of the multiple management-target apparatuses, and a conclusion event, which is a cause in a case where the one or more condition events have occurred, the method comprising the steps, performed by the control device, of:
   determining a first event group, which is multiple events presumed to occur as a result of a same cause, by calculating co-occurrence probabilities of a plurality of events which have occurred based on an event occurrence log including contents and an occurrence date and time of the plurality of events which have occurred;
   creating a new rule in which one event of the first event group is the conclusion event for the new rule and a remainder of the multiple events are the condition events; and
   storing the created new rule in the storage device, wherein the storage device is configured to store one or more existing rules, which denote an association between one or more condition events corresponding to one or more events capable of occurring in any of the multiple management-target apparatuses and a respective conclusion event, which is the cause in a case where the one or more condition events have occurred, and an analysis log, which includes information for identifying an existing rule which has been used in an analysis of a root cause.

2. A method according to claim 1, the method further comprising:
   determining, based on the event occurrence log and the analysis log and with respect to an existing rule which has been used in the analysis of the root cause, a second event group, which is one or more events that are highly likely to occur in a case where a condition event of the existing rule has occurred and that are other than the one or more condition events of the existing rule, and determining a combination of events of the one or more condition events of the existing rule and events of the second event group as the first event group.

3. A method according to claim 2, further comprising:
   creating the new rule in a case where the management-target apparatuses, which are origins of events of the first event group, have a mutual connecting relationship.

4. A method according to claim 3, further comprising:
   creating, as the new rule, a first new rule in which the conclusion event of the existing rule which has been used in the root cause is a conclusion event, and a second new rule in which one event of the second event group is a conclusion event.

5. A method according to claim 4, further comprising:
   displaying the contents of the created new rule on a prescribed display apparatus;
   receiving from a user an input denoting whether or not the new rule is to be used in the root cause analysis; and
   using, in a case where an input to the effect that the new rule is to be used in the root cause analysis has been received, the created new rule in the root cause analysis thereafter.

6. A method according to claim 5, further comprising:

storing in the storage device information to the effect that a displayed third new rule is not to be used in the root cause analysis in a case where an input to the effect that the third new rule is not to be used in the root cause analysis has been received from the user; and causing contents of a fourth new rule newly created thereafter not to be displayed on the prescribed display apparatus in a case where the fourth new rule is the same as the third new rule.

7. A method according to claim 1, further comprising:

creating the new rule in a case where the management-target apparatuses, which are origins of events of the first event group, have a mutual connecting relationship.

8. A method according to claim 7, further comprising:

displaying the contents of the created new rule on a prescribed display apparatus;

receiving, from a user, an input denoting whether or not the new rule is to be used in the root cause analysis; and using, in a case where an input to the effect that the new rule is to be used in the root cause analysis has been received, the created new rule in the root cause analysis thereafter.

9. A system for supporting an analysis of a root cause of an event, which has occurred in any of multiple management-target apparatuses, based on one or more rules in a storage device, that denote an association between one or more condition events corresponding to one or more events capable of occurring in any of the multiple management-target apparatuses and a conclusion event, which is a cause in a case where the one or more condition events have occurred, the system comprising:

the storage device; and a control device, which is connected to the storage device, wherein the storage device stores an event occurrence log including contents and an occurrence date and time of a plurality of events which have occurred, wherein the control device is configured to perform the following:

determining, a first event group, which is multiple events presumed to occur as a result of a same cause, by calculating co-occurrence probabilities of the plurality of events based on the event occurrence log; and creating a new rule in which one event of the first event group is the conclusion event for the new rule and a remainder of the multiple events of the first event group are the condition events, wherein the storage device is configured to store one or more existing rules, which denote an association between one or more condition events corresponding to one or more events capable of occurring in any of the multiple management-target apparatuses and a respective conclusion event, which is the cause in a case where the one or more condition events have occurred, and an analysis log, which includes information for identifying an existing rule which has been used in a root cause analysis.

10. A system according to claim 9, wherein the control device is configured to perform the following:

determining, based on the event occurrence log and the analysis log and with respect to an existing rule which has been used in the analysis of the root cause, a second event group, which is one or more events that are highly likely to occur in a case where a condition event of the existing rule has occurred and that are other than the one or more condition events of the existing rule, and determining a combination of events of the one or more condition events of the existing rule and events of the second event group as the first event group.

11. A system according to claim 10, wherein the control device is configured to perform the following:

creating the new rule in a case where the management-target apparatuses, which are origins of events of the first event group, have a mutual connecting relationship.

12. A system according to claim 11, wherein the control device is configured to perform the following:

creating, as the new rule, a first new rule in which the conclusion event of the existing rule which has been used in the root cause is a conclusion event, and a second new rule in which one event of the second event group is a conclusion event.

13. A system according to claim 12, wherein the control device is configured to perform the following:

displaying the contents of the created new rule on a prescribed display apparatus, receiving from a user an input denoting whether or not the new rule is to be used in the root cause analysis, and using, in a case where an input to the effect that the new rule is to be used in the root cause analysis has been received, the created new rule in the root cause analysis thereafter.

14. A system according to claim 13, wherein the control device is configured to perform the following:

storing in the storage device information to the effect that a displayed third new rule is not to be used in the root cause analysis in a case where an input to the effect that the third new rule is not to be used in the root cause analysis has been received from the user, and causing contents of a fourth new rule created thereafter not to be displayed in a case where the fourth new rule is the same as the third new rule.

15. A system according to claim 9, wherein the control device is configured to perform the following:

creating the new rule in a case where the management-target apparatuses, which are origins of events of the first event group, have a mutual connecting relationship.

* * * * *